(12) United States Patent
Ehrlund et al.

(10) Patent No.: US 10,706,187 B1
(45) Date of Patent: Jul. 7, 2020

(54) SYSTEMS AND METHODS FOR REDUCING APPLICATION STARTUP TIMES FOR PHYSICS MODELING APPLICATIONS

(71) Applicant: Comsol AB, Stockholm (SE)

(72) Inventors: Sara Ehrlund, Eskilstuna (SE); Eduardo Fontes, Vallentuna (SE); Lars Langemyr, Stockholm (SE); Svante Littmarck, Dedham, MA (US); Tomas Normark, Bromma (SE); Björn Sjödin, Lexington, MA (US); Mikael Sterner, Enskededalen (SE)

(73) Assignee: COMSOL AB, Stockholm (SE)

( * ) Notice: Subject to any disclaimer, the term of this patent is extended or adjusted under 35 U.S.C. 154(b) by 790 days.

(21) Appl. No.: 15/282,469

(22) Filed: Sep. 30, 2016

Related U.S. Application Data

(60) Provisional application No. 62/236,072, filed on Oct. 1, 2015.

(51) Int. Cl.
  *G06Q 10/04* (2012.01)
  *G06F 30/20* (2020.01)
  *G06F 9/4401* (2018.01)

(52) U.S. Cl.
  CPC ............ *G06F 30/20* (2020.01); *G06F 9/4401* (2013.01)

(58) Field of Classification Search
  CPC .......................... G06F 17/5009; G06F 9/4401
  See application file for complete search history.

(56) References Cited

U.S. PATENT DOCUMENTS

| | | | |
|---|---|---|---|
| 7,596,474 B2 | 9/2009 | Langemyr | |
| 7,865,445 B2* | 1/2011 | Maeda | G06F 21/105 |
| | | | 235/379 |
| 8,219,373 B2 | 7/2012 | Fontes | |
| 8,244,869 B2* | 8/2012 | Gish | G06F 21/121 |
| | | | 709/203 |
| 8,626,475 B1 | 1/2014 | Fontes | |
| 9,098,106 B2 | 8/2015 | Danielsson | |
| 9,146,652 B1 | 9/2015 | Danielsson | |
| 9,372,673 B2 | 6/2016 | Bertilsson | |
| 2006/0106920 A1* | 5/2006 | Steeb | G06F 9/5005 |
| | | | 709/220 |

(Continued)

FOREIGN PATENT DOCUMENTS

WO   WO 2014/100727 A1   6/2014

*Primary Examiner* — Umut Onat
*Assistant Examiner* — Abdou K Seye
(74) *Attorney, Agent, or Firm* — Nixon Peabody LLP

(57) ABSTRACT

Systems and methods include preparing instances of physics modeling applications for use over a computer network based on expected use by a user of a modeling system. A server system remote from the user is configured to implement the acts of (i) determining an expected usage of the physics modeling applications, (ii) pre-launching an inactive application server and pre-loading an inactive instance of physics modeling applications, that meets pre-determined statistical usage criteria, onto the pre-launched application server, and (iii) sending at least a portion of the instance of the physics modeling application, wherein the pre-launching and/or pre-loading provide a reduced startup time of the pre-launched inactive application servers and the pre-loaded instance of the physics modeling application.

15 Claims, 28 Drawing Sheets

(56) References Cited

U.S. PATENT DOCUMENTS

| | | | | |
|---|---|---|---|---|
| 2006/0107335 A1* | 5/2006 | Frank | ................... | G06F 21/10 |
| | | | | 726/27 |
| 2006/0165227 A1* | 7/2006 | Steeb | ................... | G06F 21/10 |
| | | | | 379/201.03 |
| 2008/0281652 A1* | 11/2008 | Iqbal | ................... | G06Q 10/06 |
| | | | | 705/7.36 |
| 2012/0324481 A1* | 12/2012 | Xia | ................... | G06F 9/485 |
| | | | | 719/320 |
| 2013/0239089 A1* | 9/2013 | Eksten | ................... | G06F 8/70 |
| | | | | 717/120 |
| 2014/0047407 A1* | 2/2014 | Danielsson | ................... | G06F 8/00 |
| | | | | 717/104 |

\* cited by examiner

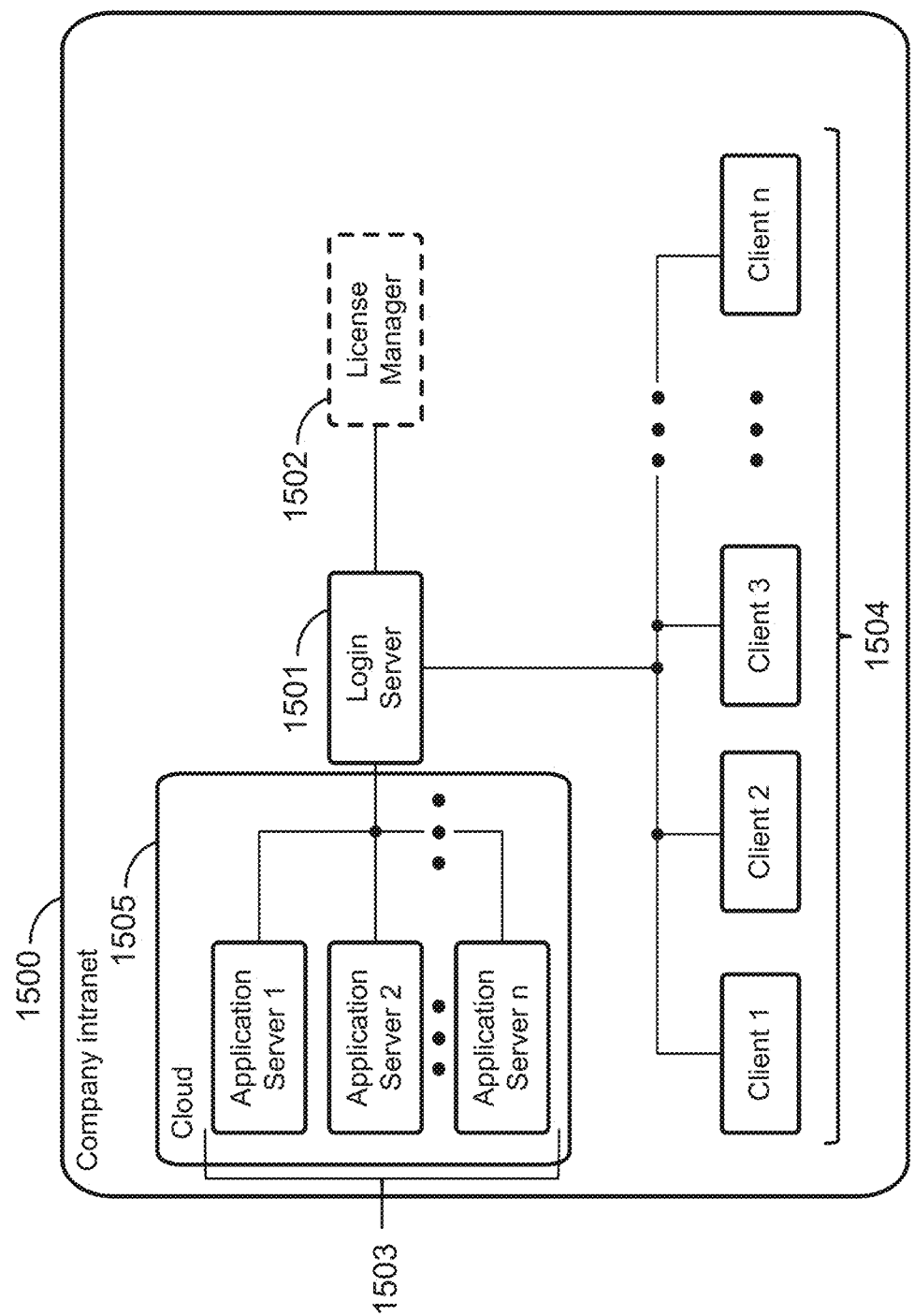

SYSTEMS AND METHODS FOR REDUCING APPLICATION STARTUP TIMES FOR PHYSICS MODELING APPLICATIONS

CROSS-REFERENCE TO RELATED APPLICATIONS

This application claims priority to and the benefits of U.S. Provisional Application No. 62/236,072, filed Oct. 1, 2015, the disclosure of which is hereby incorporated by reference herein in its entirety.

FIELD OF THE INVENTION

This disclosure relates to modeling and simulation systems, and more particularly to systems and methods for reducing physics and/or multiphysics modeling and/or simulation application startup times.

BACKGROUND

Modeling and simulation systems, such as multiphysics modeling and simulation systems, operate on physical computer systems often including terminals through which users interact with the modeling and simulation applications over a network. Multiphysics modeling and simulation systems are complex combinations of hardware and software operating on standalone devices or over computer networks where the startup times for such applications can include lengthy launch and/or load times that can increase inefficiencies for system users.

SUMMARY OF THE INVENTION

According to one aspect of the present disclosure, a server system is described for preparing one or more instances of physics modeling applications for use over a computer network based on expected use by a client user of a simulation system. The server system comprises a physical computing system including one or more processing units, a communication interface, and one or more physical memory devices. At least one of the one or more physical memory devices includes executable instructions for causing at least one of the one or more physical processors to perform, upon execution, the acts of: (i) determining an expected usage of one or more physics modeling applications based on at least one statistical model executed on at least one of the one or more physical processors or stored on at least one of the one or more physical memory devices; (ii) in response to determining that the expected usage meets a pre-determined statistical usage criteria, pre-launching one or more inactive application servers of the physical computing system and pre-loading at least one of the one or more inactive instances of physics modeling applications that meet the pre-determined statistical usage criteria onto one or more of the pre-launched application servers; (iii) receiving via a computer network communicatively coupled to a communication interface of the server system, an input signal indicative of a user request to initiate at least one of the one or more instances of physics modeling applications; and (iv) in response to receiving the input signal, transmitting to the computer network via the communications interface at least a portion of the one or more instances of physics modeling applications, one or both of the pre-launching and pre-loading providing a reduced startup time of the pre-launched one or more inactive application servers and the pre-loaded one or more instances of physics modeling applications.

According to another aspect of the present disclosure, a computer-implemented method is described for preparing one or more instances of physics modeling applications for use over a computer network based on expected use by a user of a modeling system. The method is implemented on a server system remote from the user of the modeling system. The server system includes one or more physical processors and one or more memory devices. The one or more physical processors are configured to implement the acts of: (i) determining an expected usage of the one or more physics modeling applications based on at least one statistical model executed on at least one of the one or more physical processors or stored on at least one of the one or more memory devices; (ii) in response to determining that the expected usage meets a pre-determined statistical usage criteria, pre-launching one or more inactive application servers and pre-loading at least one of the one or more inactive instances of physics modeling applications that meet the pre-determined statistical usage criteria onto one or more of the pre-launched application servers, the pre-loading of the at least one of the one or more instances of physics modeling applications being made onto at least one of the one or more memory devices, the at least one of the one or more memory devices operating on one or more servers of the server system; (iii) receiving from a computer network communicatively coupled to a communications interface of the server system, an input signal indicative of a user request to initiate one or more instances of physics modeling applications; and (iv) in response to receiving the input signal, sending to the computer network via the communications interface at least a portion of the one or more instances of physics modeling applications, one or both of the pre-launching and pre-loading providing a reduced startup time of the pre-launched one or more inactive application servers and the pre-loaded one or more instances of physics modeling applications.

According to yet another aspect of the present disclosure, a simulation system is configured to receive data corresponding to one or more instances of physics modeling applications determined according to an expected usage of the physics modeling applications. The expected usage is determined based on at least one statistical model executed on a server system communicatively coupled to the simulation system. The server system is configured to pre-launch one or more inactive application servers and pre-load one or more inactive instances of physics modeling applications onto one or more of the pre-launched application servers in response to determining that the expected usage meets pre-determined usage criteria. The simulation system comprises one or more physical memory devices, one or more display devices, one or more user input devices, a communications interface configured to be coupled to a computer network, and one or more physical processors configured to execute instructions stored on at least one of the one or more physical memory devices, the instructions causing at least one of the one or more physical processors to perform the acts of (i) generating, via the one or more input device, an input signal indicative of a user request to initiate a physics modeling application; (ii) sending, via the communication interface, an output signal to the computer network, the output signal indicative of the user request to initiate an instance of the physics modeling application; (iii) in response to sending the output signal, receiving from the computer network, via the communications interface, data corresponding to at least a portion of the one or more pre-launched instances of physics modeling applications including data corresponding to a user interface; and (iv) displaying the user interface on at least one of the one or more display devices.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 15 illustrates an exemplary usage scenario where application server(s) are located on cloud computing nodes and connected to a login server, clients, and a license manager, all located within a local area network or within an a private network, according to aspects of the present disclosure.

Figure 1A:
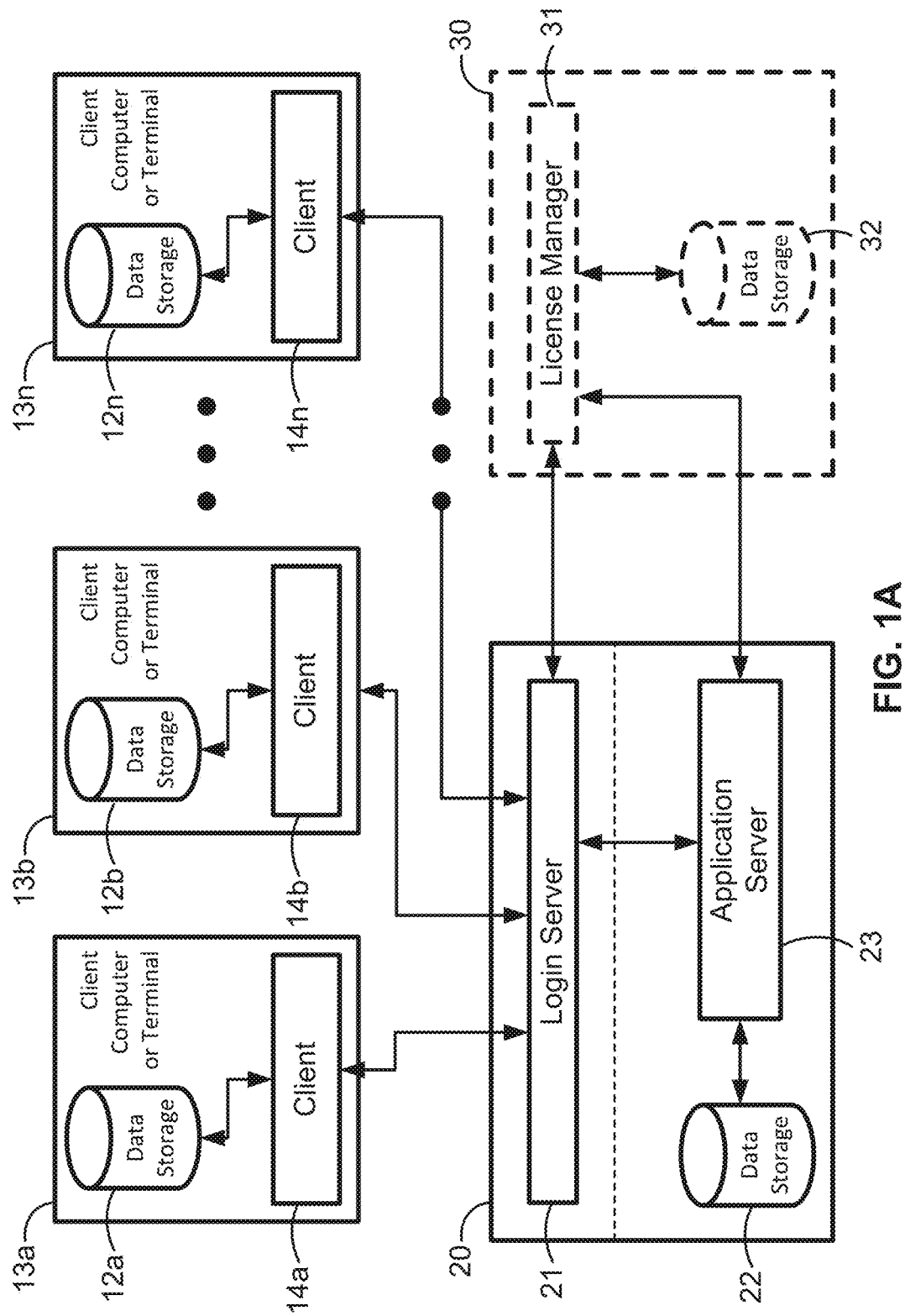
FIG. 1A-1B illustrate exemplary client and server systems for providing user access to applications for forming and solving problems in a physics and multiphysics modeling system, according to aspects of the present disclosure.

While the present disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as discussed in the detailed description and/or as defined by the appended claims.

DETAILED DESCRIPTION

While this invention is susceptible of embodiment in many different forms, there is shown in the drawings and will herein be described in detail aspects of the invention with the understanding that the present disclosure is to be considered as an exemplification of the principles of the invention and is not intended to limit the broad aspect of the invention to the aspects illustrated. For purposes of the present detailed description, the singular includes the plural and vice versa (unless specifically disclaimed); the word "or" shall be both conjunctive and disjunctive; the word "all" means "any and all"; the word "any" means "any and all"; and the word "including" means "including without limitation."

The present disclosure describes desirable improvements to the functionality of modeling and simulation systems, and more particularly for physics (including multiphysics) modeling applications. An application is a customized simulation platform or program developed using a modeling and/or simulation system. In some aspects, applications include customized interfaces and controls the inputs and outputs that a user of the application is allowed to manipulate. For example, an application for a modeling and simulation system, such as COMSOL Multiphysics® Version 5 (available from COMSOL, Inc. of Burlington, Mass., USA), can be customized to include only parameters relevant to a specific design of a specific device or process. Non-limiting examples of physics modeling applications might include a small concert hall analyzer (e.g., acoustics), a biosensor design (e.g., chemical reactions), a transmission line calculator (e.g., electric current and material properties), a corrugated circular horn antenna simulator (e.g., radio frequency), a plasmonic wire grating analyzer (e.g., radio frequency and wave optics), a distributed Bragg reflector filter (e.g., ray optics), concentric tube heat exchanger dimensioning (e.g. heat transfer), heat sink with fins (e.g., heat transfer), red blood cell separation (e.g., microfluidics and particle tracing), an ion implanter evaluator (e.g., molecular flow), a wavelength tunable LED (e.g., semiconductors), a truck-mounted crane analyzer (e.g., structural mechanics and multibody dynamics), a parameterized concrete beam (e.g., structural mechanics and geomechanics), a frame with cutout subjected to random load (e.g., structural mechanics and fatigue), lithium-ion battery impedance (e.g., batteries and fuel cells), or a gas box (e.g., pipe flow). As demonstrate by the non-exhaustive list of applications, it is contemplated that applications can span across many (and in some aspects most or all) engineering disciplines.

One desirable aspect of the present disclosure includes a system of one or more computing systems, such as computer servers, or cloud compute nodes, running inactive application servers, where one or more of the inactive application servers includes one or more inactive instances of different physics or multiphysics modeling applications, thus allowing a user to commence using a physics or multiphysics modeling application without having to wait for the application server to launch or for the instance of the application to load. Thus, the present disclosure provides for reduced application startup times for the implementation or execution of customized physics (including multiphysics) simulations.

In some aspects, it is contemplated that an application loaded on an application server and an instance of an application may be used interchangeably. The terminology pre-loaded and loaded are often used interchangeably. An instance of an application which is loaded on an application server prior to a user requesting use of the instance of the application can be considered pre-loaded.

In some aspects, systems and methods are contemplated for physics or multiphysics simulations, performed using applications on computer systems connected to terminals through which users may interact with said applications over a network. Reducing the startup time of instances of such applications, license handling of such applications, and saving and reusing instances of such applications are desirable. Various examples of physics and multiphysics modeling and simulation systems and related applications for which the advantageous aspects of reducing startup time can be applied, include applications developed using COMSOL Multiphysics® Version 5 along with other versions (available from COMSOL, Inc. of Burlington, Mass., USA), and applications developed via exemplary modeling and simulation systems described in U.S. Pat. Nos. 7,596,474; 8,219,373; 8,626,475; 9,098,106; and 9,146,652 and International Publication No. WO2014/100727, the disclosures of which are each hereby incorporated by reference herein in their entireties.

The use of the term "application" can generally be understood to refer to applications for physics or multiphysics modeling and/or simulation.

The use of the term "connected" in this disclosure does not require a direct or physical connection. Devices, modules, applications, and other components may be "connected" if they are communicatively coupled with another component. This may include direct physical connection, wireless connection, virtual connection (such as through nodes of a network), or any other type of connection that allows the connected components to communicate with each other.

A physics (or multiphysics) application for simulating specific physics (or multiphysics) models may be run by a user on one or more computer systems such as servers or cloud compute nodes, connected to one or more clients, located on terminals, such as computers, tablets, pads, phones or other devices capable of communication, through which the user connects to the one or more computer systems such as servers or cloud compute nodes and interacts with the application over a network. Each computer system may include one or more application servers and each application server may run one or more instances of various physics (or multiphysics) modeling applications.

It would be desirable for a user of one or more physics (or multiphysics) modeling applications to be able to access an application and start a simulation in as little time as possible. The time required to access and start using an application is reduced where an application server is pre-launched on a computer system, prior to the user trying to access the application server rather than the user having to wait on the application server launching once the user tries to access an application. Further benefit is derived by an application server loading an instance of the specific application that the user wants to use into memory before the user is able to access the instance of the application. This is a time consuming process and it is advantageous, saving time for the user, if the instance of the application is pre-loaded onto the pre-launched application server.

An application server or an instance of an application, which is pre-launched or pre-loaded respectively, and is not being used by a user, may be referred to as an inactive application server or an inactive instance of an application respectively.

An application server or an instance of an application which is being used by a user may be referred to as an active application server or an active instance of an application respectively.

Figure 1B:
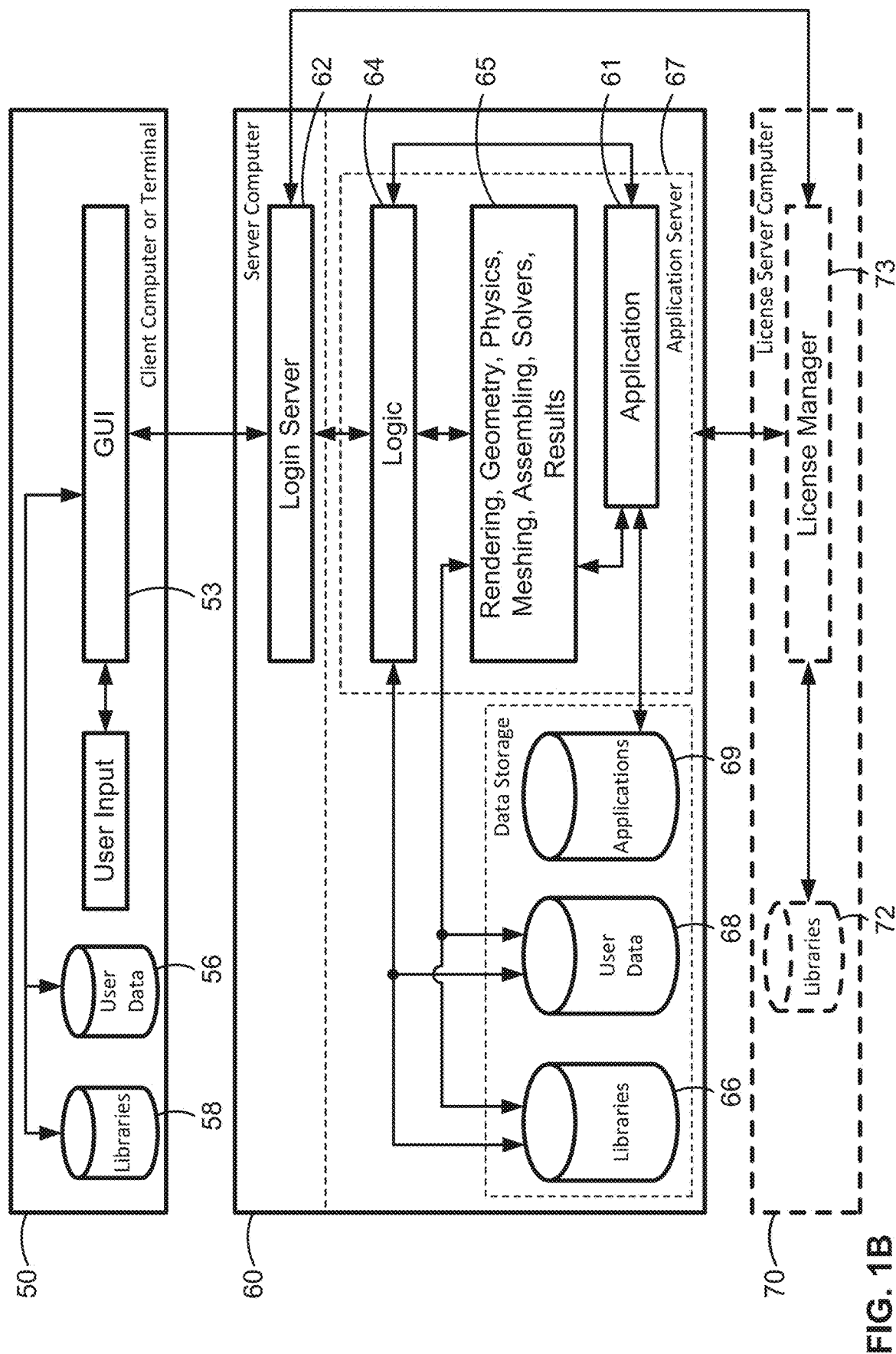

Referring now to FIGS. 1A-1B, exemplary aspects of computer and server systems are illustrated that may be used with the methods and systems described herein including modeling and simulation systems using instances of applications on application servers, connected to one or more clients, and optionally to one or more license managers.

Turning now to FIG. 1A, a non-limiting exemplary aspect of a system is described that is adapted to model and simulate a physics or multiphysics phenomena using instances of applications on application servers and connected clients. The system can include one or more physical client processing systems (14*a*, 14*b* . . . 14*n*) that are associated with users or client users. In some aspects, the client processing systems (14*a-n*) may include components corresponding to a modeling and simulation system, such as components that when executed on a physical processor present in client computer(s) or terminal(s) (13*a*, 13*b* . . . 13*n*) cause the client processing system to display a graphical user interface, receive user input, and display outputs of the modeling and simulation system that are results of the user input. The client processing system(s) (14*a*, 14*b*, . . . 14*n*) may further include software components that generate input commands, send user input data, and send generated input commands to a server system 20 connected to the client processing system(s). In some aspects, the server system 20 includes one or more application servers 23. The client processing system(s) (14*a-n*) may also receive output data and output commands from the server system 20 where the output data and output commands relate to the user input previously sent to the server system 20. The client processing system(s) (14*a-n*) and the server system 20 may each include their own data storage devices (12*a*, 12*b* . . . 12*n*, 22). It is further contemplated that physical client processing system(s) can further include components, that upon execution, implement output commands and display output data in a graphical user interface.

In some aspects, the client processing systems (14*a*, 14*b*, and 14*n*) may be connected to the application server 23, through a login server 21, which may be located in server system 20, or in a separate server system. In some aspects, the login server may additionally communicate directly with the clients (14*a*, 14*b*, and 14*n*), directly with the server system 20, or the login server may also communicate with a license manager 31. The user may log-in and log out to the server system 20 using the login server and the login server may in response check-out and check-in, respectively, one or more licenses from the license manager 31. The login system may further connect a specific client (14*a*, 14*b*, or 14*n*) to a specific application server 23.

In some aspects, the server system 20 can include subsystems, that upon execution, receive input data and input commands from connected client processing system(s) (e.g., 14*a*, 14*b* . . . 14*n*). In some aspects, the server system 20 can further include executable components for sending input data to and receiving data from a license server computer 30 that includes a license manager 31 and may also have data storage device(s) 32. The license server computer 30 can be used to control access to certain operations of a modeling and simulation system. In some aspects, the server system 20 can further include executable components for generating output data and output commands based on the received input data, input commands, and/or control data; and send these output data and output commands to any one of the client processing system(s) (14*a-n*). In some aspects, the server system 20 may also include executable components to verify if an input command can be executed, as determined by the received control data.

Physical modeling and simulation processing units, display devices, and/or memory devices are contemplated to be a part of the client processing systems 14*a-n*, server system 20, and/or license server system 30.

Turning now to FIG. 1B, another non-limiting exemplary aspect of a modeling and simulation system is described that is adapted to model and simulate a physics (or multiphysics) phenomena, using instances of applications on application servers with connected clients. The system includes a client processing system 50 with executable components for a graphical user interface 53, where user input may be received and output may be displayed. The client processing system 50 can store user data generated through user input and output received from a server system 60. The client processing system 50 may also locally store executable software component libraries which are used to display graphical user interface(s), receive input, generate input commands, execute output commands, and display output. User data can be stored on client user data storage component 56 or on a server system user data storage component 68. Similarly, library data can be stored locally on a client library storage component 58.

In one illustrative aspect, user input may be received via the GUI 53 of the client processing system 50 based on a user selecting an option via the GUI 53 to create an exemplary geometry (e.g., a cylinder geometry). The input and input commands may be sent to the connected server system 60. Output data and output commands received from the server system can then be executed on the client processing system 50 to render and display the exemplary cylinder geometry and to refresh the graphical user interface 53, based on the exemplary user input (e.g., for a cylinder). Thus, the server system 60 can receive user input data and input commands from a client processing system 50 and use the received data and commands to generate output data and output commands that are then received by the client processing system 50. These output data and output commands determine what will be shown in the graphical user interface 53 in the client processing system (50) and are based on the user input.

The available input data and input commands, as well as output data and output commands, may depend on the type of application 61, loaded on an application server 67, present on the server system. Several different applications may be stored on a data storage system 69.

The application server system 67 can include executable components that determine certain operations associated with a modeling and simulation system. For example, upon execution of logics component 64, which is similar to an application program interface component, the logics component 64 can receive input data and input commands from the client processing system 50 and determine how to process received input. The logics component 64 can determine which modeling and simulation software components should be used to process input data and execute input commands, and which components should be used to generate output data and output commands, based on the user input. The input data and input commands may be relayed by the logics component(s) 64, upon execution, to one or more of rendering, geometry, physics, meshing, assembling, solver, and results components (collectively identified as module 65). The output data and the output commands from module 65 can then be relayed to the client processing system 50 by the logics component(s) 64.

The client 50 may be connected to the application server 67, through a login server 62, which may be located in server system 60, or in a separate server system. The login server may additionally communicate directly with the client 50 and directly with the application server 67 and may also communicate with a license manager 73. The user may log-in and log-out to the server system 60 via the login server, and the login server may in response check-out and check-in respectively, one or more licenses from the license manager 73. The login system may further connect a specific client 50 to a specific application server 67.

The server system 50 may store and access logics component libraries 66. The server system 50 may also store user data 68 used by the logics components 64. As discussed above, the server system 50 may also include aspects for rendering the graphical user interface in module 65, that builds the geometry, defines the physics, generates the mesh, assembles the numerical model, solves the numerical model, and/or generates the output data and output commands, in a physics modeling application.

Referring back to the illustrative example of the cylinder, a logics component 64 can receive user input in the form of input data and input commands for generating a cylinder and send these data and commands to a geometry component that is part of module 65. The geometry component executes the cylinder command and sends an output to the rendering component that is also a part of module 65. The logics component 64 may then receive the output from the rendering component and send rendering data, for the cylinder geometry, together with its settings, to the client processing system 50 for display in the graphical user interface 53.

The server system 60 may also store and access library components 66 for rendering, building the geometry, generating the mesh, assembling the numerical model, solving the numerical model equations, and/or generating the results.

In some aspects, the graphical user interface 53 and the logics components 64 may send data and commands that may trigger a control check in the rendering, geometry, physics, meshing, assembling, solvers, and/or results components of module 65, which then may generate a request that is sent to a license server 70. The server system 60 may then receive data from license server system 70 that is used to determine if it should allow the execution of commands. The data sent to the server system 60 from the license server system 70 is generated by the license manager 73 using a file that may be stored, for example in the libraries component 72, of the license server system 70.

Physical modeling processing units, display devices, and/or memory device are contemplated to be a part of the client processing system 50, server system 60, and/or license server system 70.

Launching an application server may be a time consuming process. The same may be true for loading an instance of an application onto an application server. It would be advantageous to reduce the amount of time a user has to wait until the user is able to commence modeling through an improvement to the functionality of a server system.

Figure 2A:
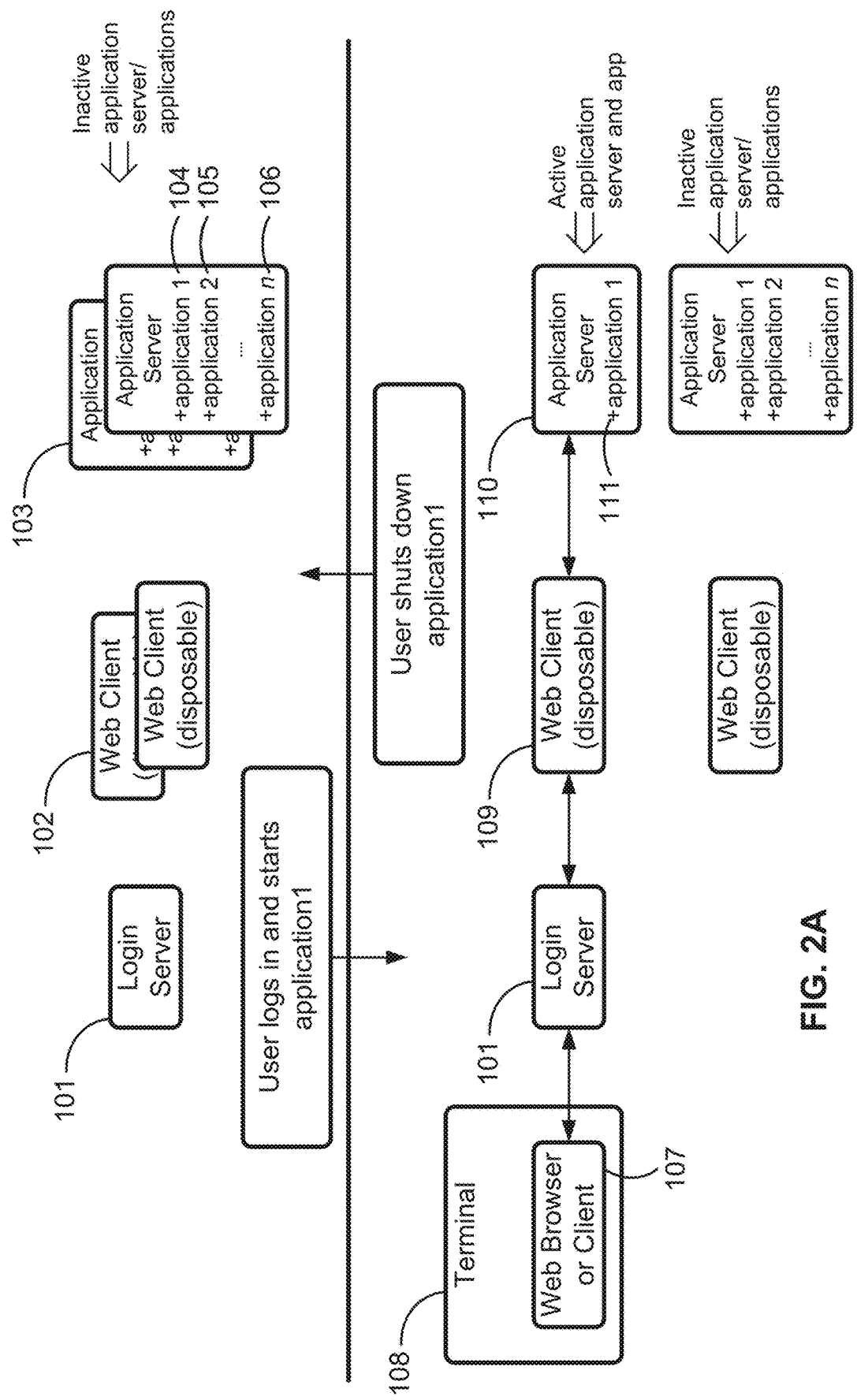
FIGS. 2A-2B illustrate exemplary pre-launched application servers and pre-loaded instances of applications to reduce application startup time, according to aspects of the present disclosure.

Referring now to FIG. 2A, a system is illustrated for improving application startup speed. The system includes a login server 101 and optionally one or more pre-launched web clients 102. In some aspects, the web client may be disposable where they are not reused. In other aspects the web clients may be reused. The illustrated system further includes one or more inactive application servers 103, where each application server includes one or more instances of inactive applications (e.g., 104, 105, 106). A user may log in to the login server 101, using a web-browser (or a dedicated client) 107 present on a terminal 108. Following the login, a user may be presented with a plurality of applications in the web-browser graphical user interface and the user may select one of the applications. In the non-limiting exemplary aspect from FIG. 2A, the user selects application 1 (104). In response to the user selecting application 1 (104), the login server 101 then establishes a connection between the user's web-browser and the pre-launched application server, optionally using a pre-launched web-client 109. In response to application 1 (104) being selected, one of the inactive application servers 103 that includes an instance of an inactive application 1 (104), may turn into an active application server 110. In some aspects, the inactive instance of application 1 may turn into an active instance of application 1 (111). In some aspects, the active application server may unload the other inactive instances of applications from the application server. The user may then use the active application by inputting commands and data, using the web browser on the terminal. The user may then shut down the active application and, in response, the active application server 110 may turn inactive and load a multitude of inactive instances of applications.

In addition to connecting to an application server using a web browser, it is also contemplated that in some aspects a user will connect to an application server by using a dedicated client. It is also contemplated that a plurality of users may concurrently use a variety of client types and connect to several application servers running various instances of applications. In both of the above cases, the users' startup delay could be decreased by providing inactive application servers, including several instances of various inactive applications, which may turn active in response to a user selecting the application.

Figure 2B:
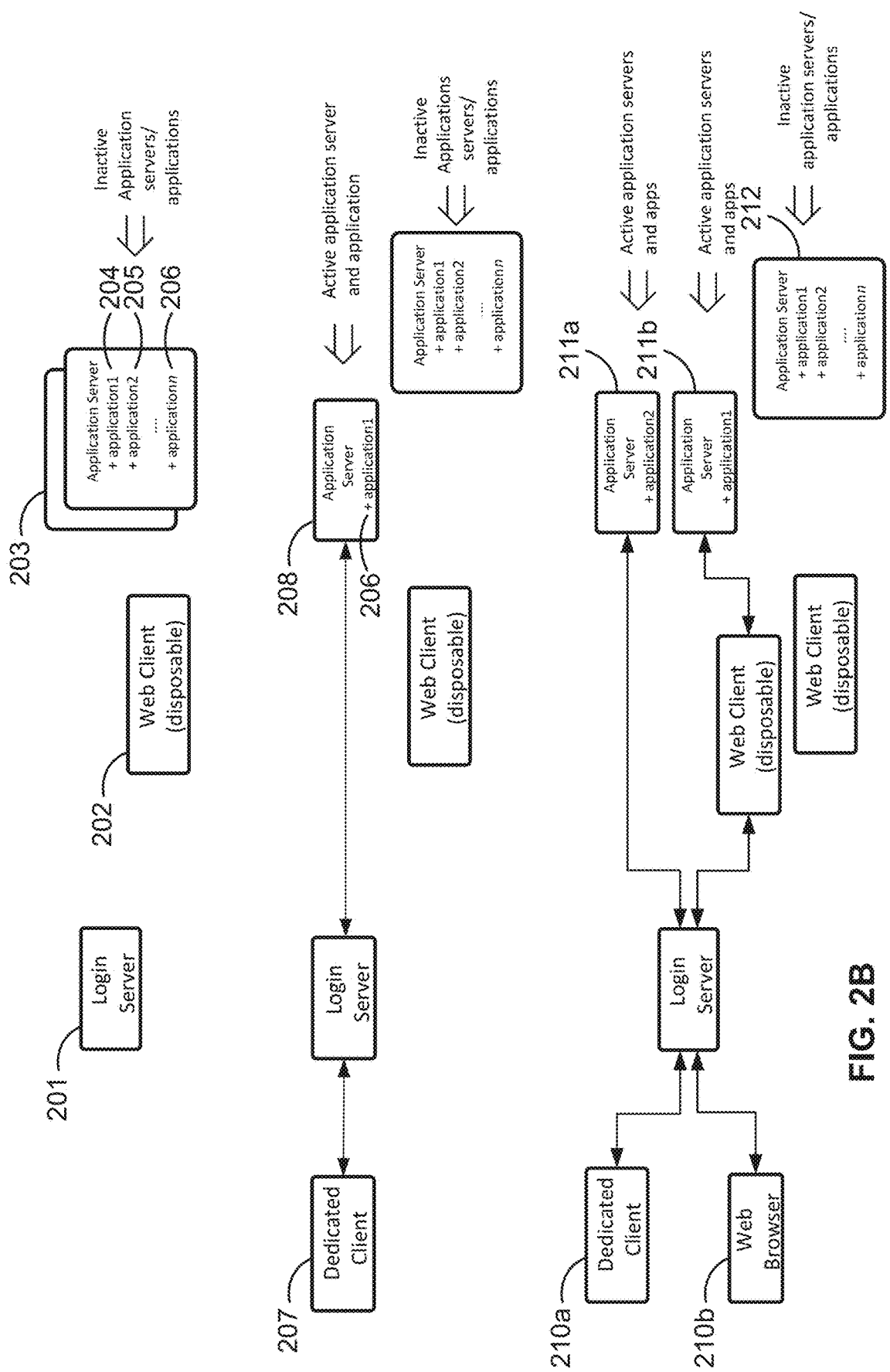

Referring now to FIG. 2B, exemplary aspects are illustrated that include a variety of clients (e.g., dedicated client, web browser) and maintaining one or more pre-launched application servers with one or more pre-loaded applications available for additional client users. The system of FIG. 2B reduces startup times, and includes a log-in server 201, optionally one or more pre-launched web clients 202, and one or more inactive application servers 203, where each application server includes one or more inactive instances of applications (204, 205, 206). The user may connect to the application server using a dedicated client 207 and connecting through the login server to the application server 208. The startup time is reduced by providing inactive application servers that include instances of one or more inactive applications for the user. By connecting to a pre-launched application server, including one or more pre-loaded instances of applications, the user does not have to wait for the application server to launch nor for the instance of the application to be loaded into memory. Once a user has connected to an inactive application server including an inactive instance of a selected application, the application server 208 and the instance of a selected application 209 may turn active in response to receiving authorization from a licensing server (not shown) that the user is authorized to use the application server and the application. License verification and license server operations are discuss in more detail elsewhere in the present disclosure.

FIG. 2B also illustrates several users connecting via different types of clients (e.g., 210a, 210b) to several application servers (e.g., 211a, 211b). In some aspects, all of the initially inactive application servers 211a, 211b may be turned active by one of the users. In certain aspects it is also contemplated that additional inactive application servers 212, including additional instances of one or more inactive applications, may be initiated in an automatic response to the number of inactive application servers and inactive instances of applications falling below a certain level. However, in some aspects it is also desirable for the number of inactive application servers to be proportioned to how often instances of applications are started. In some aspects, it is further desirable to keep the total number of inactive instances of a particular application on a system proportional to an application's frequency of use.

Figure 3:
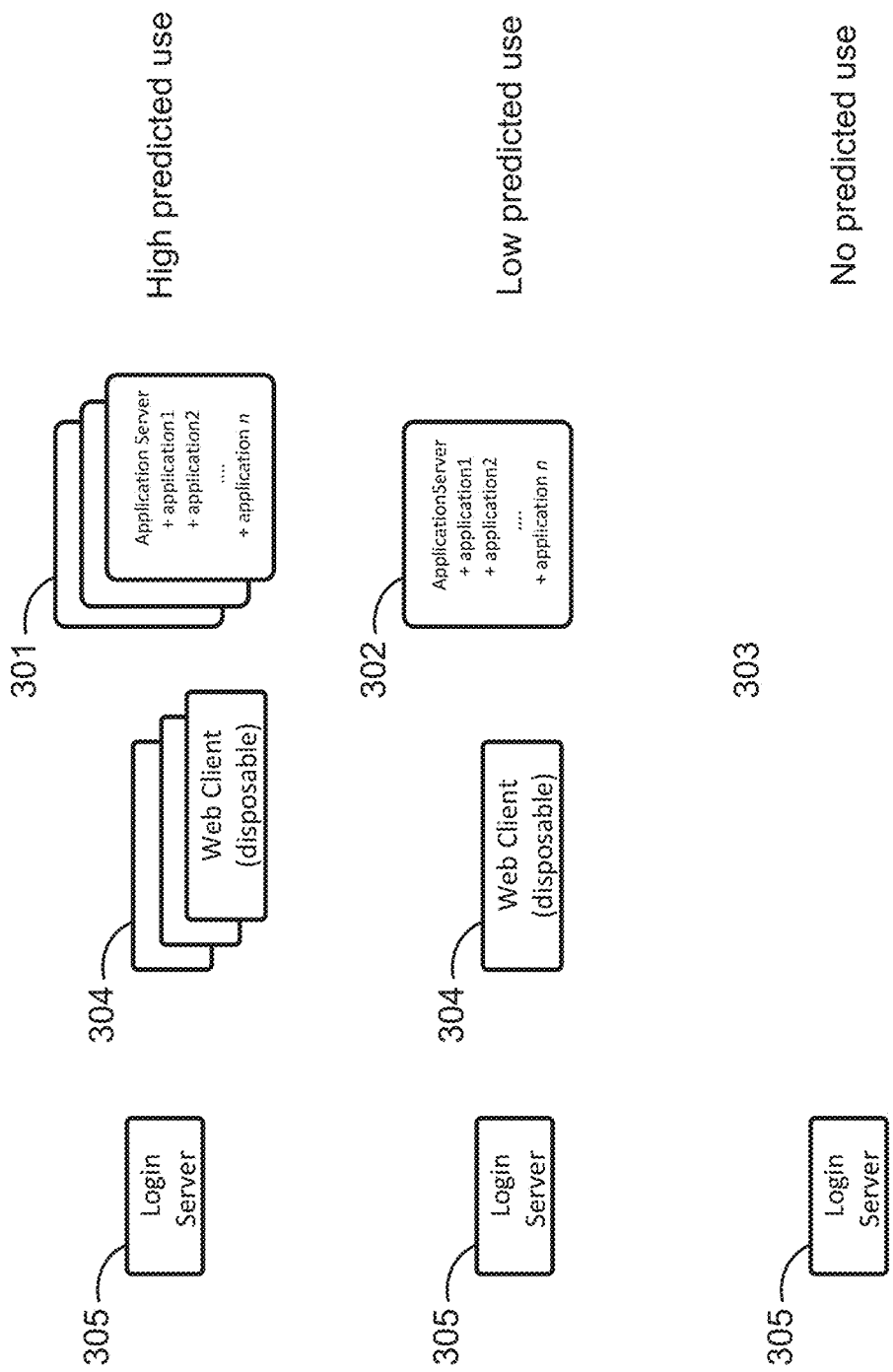
FIG. 3 illustrates exemplary aspects of predicted expected use for pre-launching application servers and pre-loading instances of applications, according to aspects of the present disclosure.

Referring now to FIG. 3, another exemplary system is illustrated where the number of inactive application servers relates to predicted server use. For example, during periods of high predicted use, many 301 application servers may be in an inactive mode in anticipation of users selecting an inactive application to run an instance of said application in an active mode. When the application use is predicted to be lower 302, the amount of inactive application servers and inactive instances of applications may be reduced. During times when no use is predicted, it is contemplated that in some aspects no inactive application servers 303 or inactive instances of applications are pre-loaded onto applications server(s). In some aspects, it is also contemplated that in addition to inactive application servers and instances of applications, one or more inactive web clients 304 may also be running in order to improve performance when running an instance of an application using a web browser. In some aspects, a login server 305 is operational whether the predicted use is no use, low use, or high use.

It is contemplated that in some aspect a grey model may be applied that describes the numbers of inactive application servers and instances of inactive applications that may run at a particular point in time. The model may, for example, be based on how often applications are started, or are predicted to be started, and depend on one or more of time of day, day of the week, date, and possibly specific events taking place during a specific time scheduled in a calendar. In some aspects, the model may also consider the amount of available computer resources. For example, assuming that use of physics (or multiphysics) applications occurs primarily in a professional or an educational setting around office hours, an initial setting of such a grey model may allow more inactive application servers and applications during office hours and fewer during nights, weekends and holidays. It may be possible to monitor and store data related to the frequency of application startups, dependent on time of day, day, and date and let the system use the data to improve the initial setting of the grey model. In some aspects, the monitored frequency distribution may be added to the initial settings. In some aspects, the initial distribution and the monitored startup frequency distribution may be weighted, and the combined distribution normalized.

In other examples, a grey model may base the number of inactive application servers on the amount of logged in users and pre-launching or shutting down application servers as more users log in or log out. The grey model may also take into account how many instances of applications that are active in relation to the number of logged in users. The system may further monitor and store information about the number of active applications in relation to the number of logged in users. The above grey model examples can also be combined in determining the numbers of inactive application servers and instances of inactive applications to run at a particular point in time.

Figure 4:
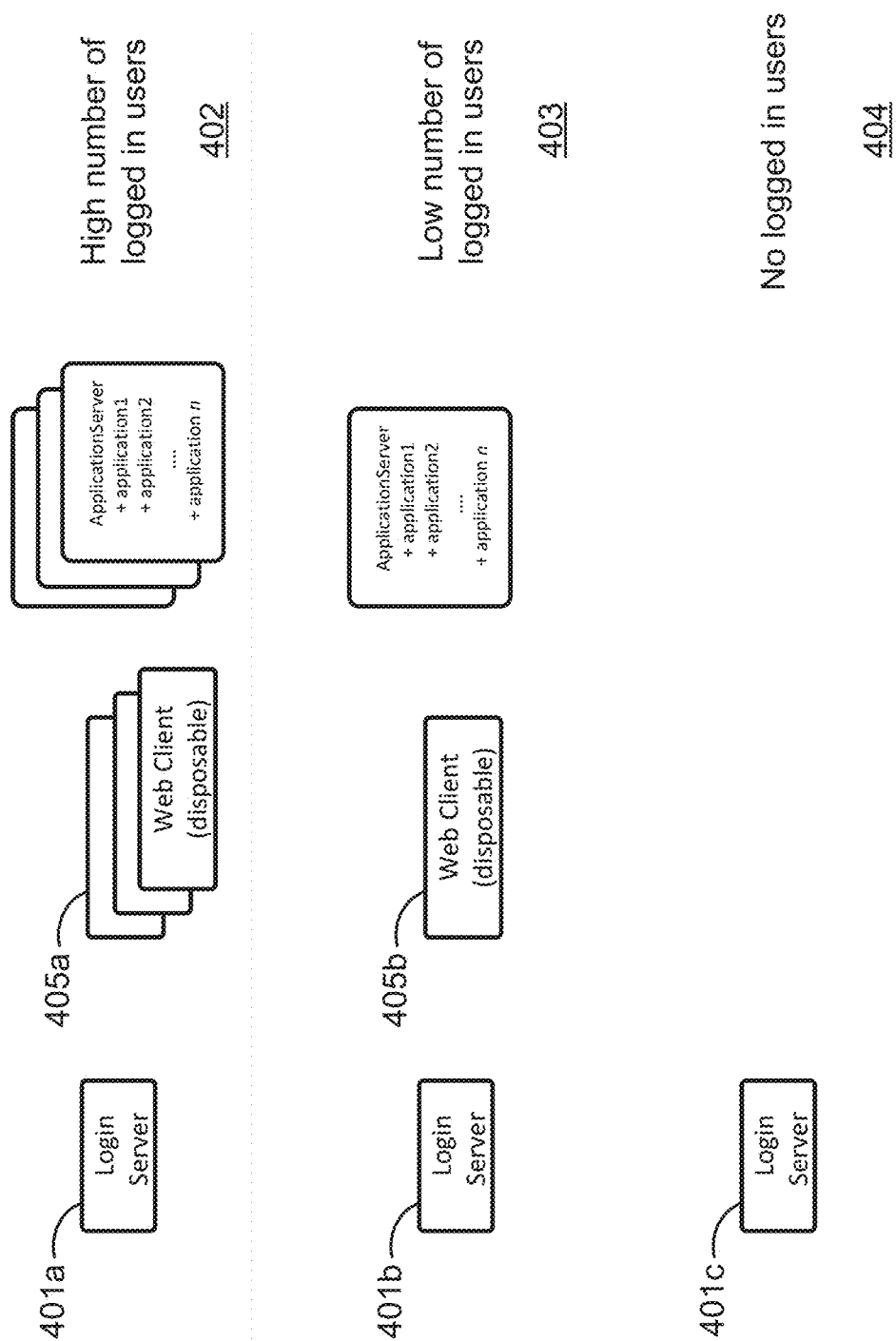
FIG. 4 illustrates exemplary pre-launching of application servers and pre-loading instances of applications based on the number of logged in users to the system, according to aspects of the present disclosure.

Referring now to FIG. 4, a system is illustrated where the number of inactive application servers and inactive instances of applications is related to the number of logged in users. When a high number of users are logged in, as detected by the login server 401a-c, the number of inactive application servers and inactive instances of applications may increase in response 402. Similarly the number of inactive application servers and inactive instances of applications may decrease 403 in response to the login server detecting a lower number of logged in users. If no users are logged in this may result in no contribution to the number of inactive application servers and inactive instances of applications 404. In some aspects, the number of web clients 405a-b may also be affected by the number of logged in users.

In some aspects, it is contemplated that the predicted server use, as discussed above for FIG. 3, and the number of logged in users, as discussed for FIG. 4, may be additive in determining the number of inactive application servers and inactive instances of applications.

In some aspects, the described grey model may provide sufficient data to determine the number of inactive application servers for most situations. However, the grey model may not provide sufficient information to decide what types of applications there should be inactive instances of and how many inactive instances of those types of applications the system should include. In some aspects, a statistical model may be desirable for determining the number of times, $app_n(i)$, an instance of each specific application i has been started during the last n application starts, where n is a positive integer possibly set by an administrator of the server system. The probability of an instance of an application i being started during the last n runs being started can then be determined by $p_n(i)$ where:

$$p_n(i) = \frac{app_n(i)}{n}$$

In some aspect, when n+1 instances of applications have been run, the first run is removed from the model and the n+1th run is added to the model. Thus the probability may be based on a moving average based on number of runs. Another exemplary option for a statistical model includes using a moving average over a specific time period or a cumulative moving average.

Figure 5:
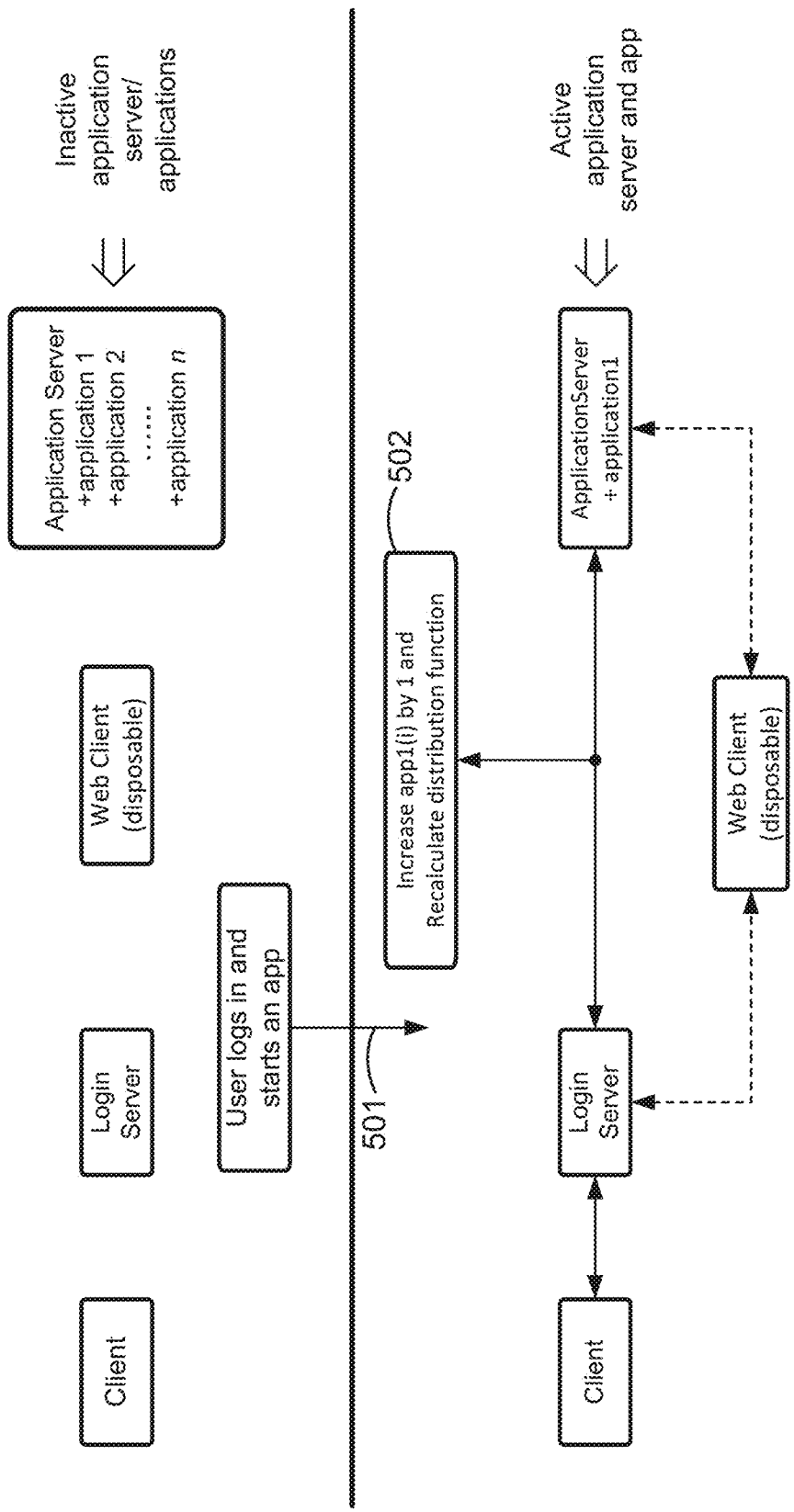
FIG. 5 illustrates exemplary pre-launching of application servers and pre-loading instances of applications based on registering usage levels of applications, according to aspects of the present disclosure.

Referring now to FIG. 5, a system is illustrated for tallying the use of an application. When a user logs in and starts an application, the use of the application is detected 501, and a counter, which registers that the particular application was used, is increased by 1 502. In some aspects, the counter is increased in response to an instance of an application becoming active. Then, in response to the counter being increased by 1, a new probability distribution may be calculated, based on the new values of the counters. It is also possible that other information is detected and stored for predicting use, such as which user used the application, the time of day, or other relevant use data. In some aspects, a web client may be used or may be optionally available.

In addition to using a statistical model based on monitoring use, it is also contemplated to manually set how many instances of an application are to be inactive. Such a distribution may be referred to as $P_{MANUAL}$. A superuser or administrator may select one or more applications and apply weights to each application, thus changing the distribution and superseding the probability function.

In some aspects, the statistical distribution and the manual distribution may be combined by, for example, adding them or applying weights to each distribution. Weights may be determined so that the resulting distribution P is normalized.

According to some aspects where the time between the startup of two instances of applications is high compared to the time required to launch an application server and loading an application, it is contemplated having one instance of each of the most popular applications inactive. When such an application is selected by a user, an instance of the selected application may become an active instance of the selected application. Then, in some aspects, a new inactive instance of the application may be loaded onto an inactive application server.

Figure 6:
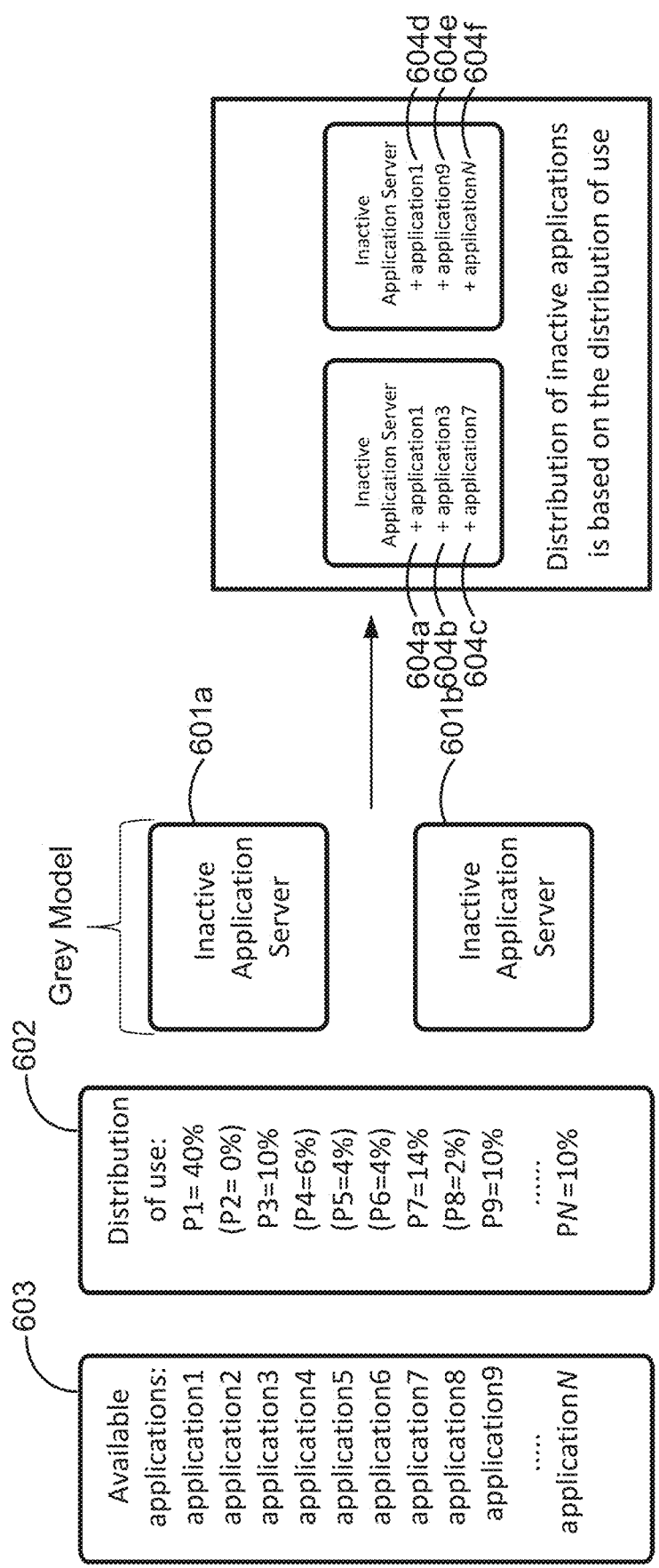
FIG. 6 illustrates exemplary aspects of determining the number of application servers to be pre-launched and what types of instances of applications should be pre-loaded based on predicted use and/or application usage level statistics, according to aspects of the present disclosure.

Referring now to FIG. 6, an exemplary illustrative aspect a system is provided where the number of inactive application servers 601a, 601b are based on a grey model (e.g., such as the exemplary grey models discussed herein), and the types and number of inactive instances of applications loaded onto the inactive application servers is based on a statistical model. The statistical model for the system is illustrated to show a distribution associated with types of physics (and/or multiphysics) applications 602 based on a detected usage of all the available physics and/or multiphysics applications 603. In this exemplary illustration, no application server has more than one instance of a particular type of application loaded. If an active application server only includes one active instance of an application, there is no benefit in loading more than one instance of an inactive application onto an application server. In the non-limiting example of FIG. 6, exemplary applications 1, 3, 7, 9 and N have sufficient usage to be pre-loaded as inactive applications 604a-f whereas exemplary applications 2, 4, 5, 6, and 8 have insufficient usage levels. Application 1, having much higher usage 605 than the other applications, is pre-loaded as an inactive instance of an application on more application servers than applications 3, 7, 9, and 10. In some aspects, the levels of usage sufficient to be pre-loaded as an inactive instance of an application, or to be loaded on more than one inactive application server, can depend on the number of inactive application servers, and on threshold levels that may be adjusted by an administrator or superuser. When more inactive application servers become available, a lower level of usage may be sufficient for an instance of an application to be loaded as an inactive instance of an application as opposed to when fewer application servers are available.

The types and number of pre-loaded instances of physics applications are maintained in association with a distribution, such as distribution 602. If the distribution is changed, for example due to users starting various instances of physics applications, the system may change the types and numbers of pre-loaded inactive instances of applications accordingly.

It may be possible for the system to maintain several usage distributions. The distributions may further be associated with user identities, so that when a user logs on to the system, one or more instances of applications that correspond to the types of applications the user have previously used, are loaded as inactive applications onto the system.

In some aspects, the type of loaded inactive instances of applications can depend on the n-last started applications. For example, the inactive application servers may include one or more inactive instances of an application or they may be empty (e.g., not include an application, such as, but not limited to, when there is not yet any data from which to form a statistical model). The system can use a counter and assign a value to each inactive instances of an application. The counter values can also take into account the number of inactive instances of an application which the system may include, and how many instances of any application that have been started at any point in time. Applying this process, determining the inactive instances of application can be simplified where providing inactive instances of applications can be done without the use of a probability distribution (e.g., exemplary distribution 602).

It is contemplated that the server system can be designed to use a variety of different methods for determining which types of applications should have an inactive instance loaded, and how many instances of each type should be loaded. In the below examples, different non-limiting cases will be described. The examples describe a non-limiting exemplary alternate method to FIG. 6 and do not include the storing or maintaining of data describing a probability distribution, such as distribution 602. The described methods, along with FIG. 6, do include an exemplary distribution of inactive instances of applications.

One exemplary method includes each of the n-last started applications being represented by typically one, but in some aspects more, inactive instances of an application, and is otherwise referred to as a "broad instances distribution". The benefit of this method, especially when the distribution includes only one inactive instance of an application, is that more types of applications may have an inactive instance of an application of that type, compared to if the number of instances of each type of application was in proportion to how many instances of each type of application had been started in the n-last starts. This may be advantageous for a system where client users use many different applications and typically don't need to start many instances of the same type of application within a short period of time.

Another exemplary method includes the number of inactive instances of a particular type of application being proportional to how often the type of application has been started in the last n-last starts, and is otherwise referred to as a "proportional instances distribution". The benefit of this method is that the number of instances of the most popular types of applications is higher, which may be advantageous when users most of the time use fewer types of applications, and when several users may want to use the same type of application within a relatively short amount of time.

Yet another exemplary method includes that some application servers are all dedicated to load an inactive instance of the last started application, creating one (or more typically several) inactive instances of the last started application, and is otherwise referred to as the "narrow instances distribution". In some aspects, each application server may include a plurality of instances of inactive applications. In the case where an application server may load, for example, three inactive instances of an application, there may be up to three different types of instances on each application server. However, there is no advantage in loading more than one inactive instance of the same type of application on an inactive application server, since the application server when turned active will unload all other instances than the instance which is used. The benefit of this method is that many instances of the last started application(s) are made available for users. This may be advantageous in, for example, a classroom or a workshop setting where many users may want to start the same application within a short timeframe.

It is contemplated that in some aspects, an increase in the number of application servers is desirable should more application servers be needed, such as if a large number of applications are started within a short period of time. While the numbers of application servers are limited in the examples described herein to simply provide an illustration of the contemplated systems and processes, the system may launch more (or fewer) application servers as they may be needed.

It is also contemplated that the methods described herein, for determining applications that should have inactive instances loaded, may be used in combination. For example, some inactive application servers can be used for the broad instances distribution, and some other inactive application servers can be used for the narrow instances distribution.

Figure 7A:
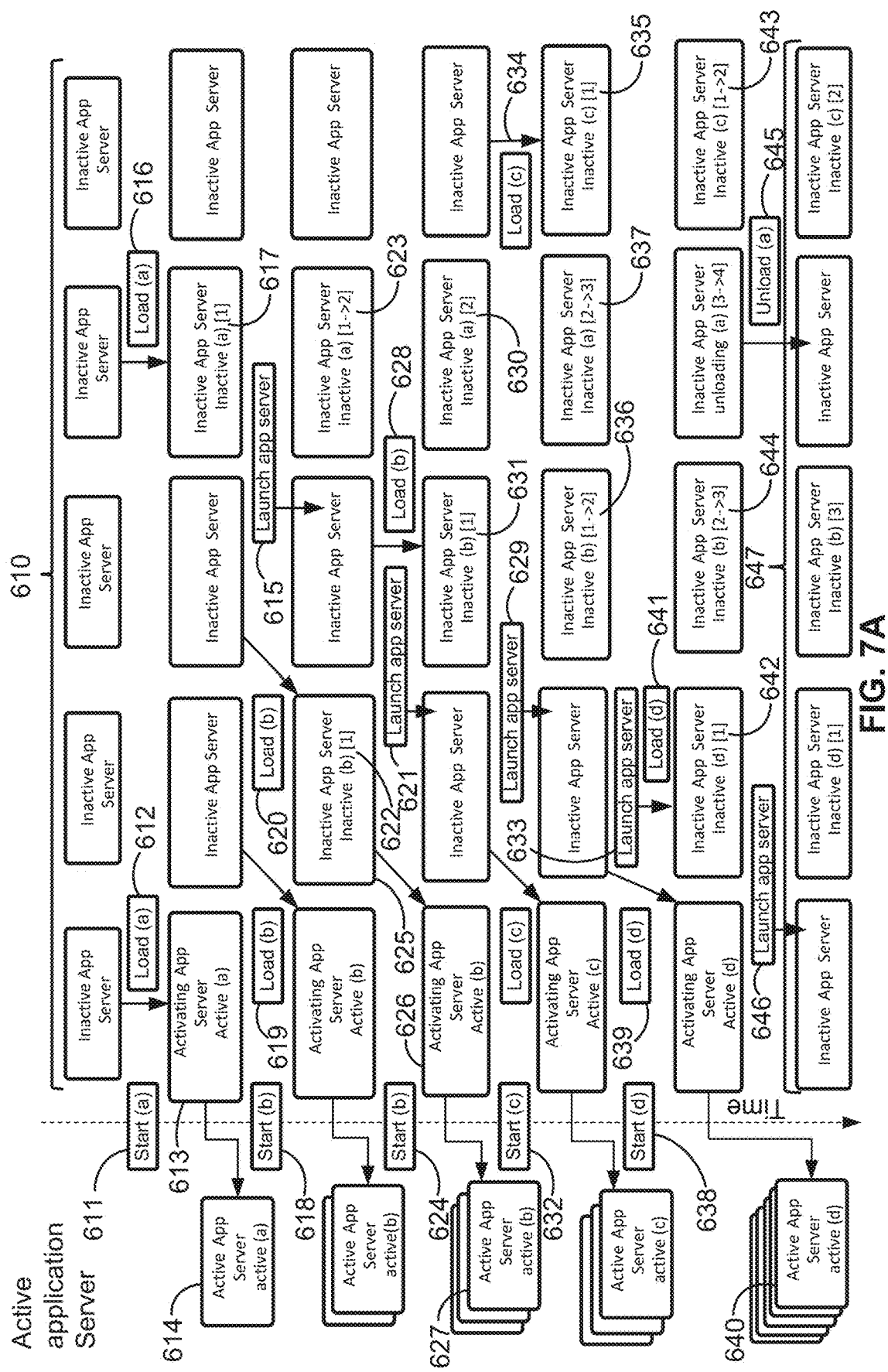
FIG. 7A illustrates an exemplary aspect for maintaining pre-loaded instances of inactive applications where only one instance of each type of application is pre-loaded, according to aspects of the present disclosure.

Referring now to FIG. 7A, an exemplary broad instance distribution is described including exemplary aspects of maintaining a number of pre-loaded instances of inactive applications where the number of instances is proportional to how often the type of application has been started. FIG. 7A illustrates an exemplary system that includes five inactive application servers 610 (though more or fewer are contemplated), with only one pre-loaded inactive instance of each type of application being pre-loaded, regardless how often a specific type of application has been started. It is contemplated that the number of application servers may increase may if more application servers are needed, for instance if a large number of applications are started within a short period of time.

The system of FIG. 7A runs applications of various types, and in this particular example, applications of type a, b, c, d and e. A user sends a command to start an instance of application a (611), if there is an inactive instance of a available, then one of the inactive application servers including an inactive instance of a may turn active and the user may run the now active instance of application a. If there is no inactive instance of a available (as assumed for the FIG. 7A example) then an instance of a will be loaded 612 onto one of the inactive application servers, the application server will turn active 613 and the user may use the instance of application a (614). However in both cases another inactive application server may be launched 615, such that there are five inactive application servers available. Additionally an inactive instance of a may be loaded by the system onto one of the inactive application servers 616. The previously mentioned counter may use a counter value or other manner of keeping count of when the inactive instance of a was initiated. While the exact location of the counter value or other manner of keeping count is not always important, in FIG. 7A (and in other figures including a counter or other manner of keeping count), the count is shown as associated with the application server and instance of an application for the sake of clarity. The counter values for any inactive instances of an application present on the system prior to this step may be increased one step, and a counter value of 1 may be assigned to the just loaded inactive instance of application a (617). In this example the counter runs from a lower number to a higher number, but counting from a higher number to a lower number is contemplated, as well as other methods used to keep track of when, or in what order, an instance of an application was started/requested. When the counter runs to 4 in this example, the inactive instance of the application is unloaded.

Next, a user may send a command to the system that they want to run an instance of application b (618). Similar to the above description, one of the inactive application servers may load an instance of b (619). However if there is an inactive application server with an inactive instance of application b available, then the application server and instance of application b will turn active and be used. The command to start an instance of application b may, directly or indirectly, make one of the inactive application servers load an inactive instance of b (620). Another inactive application server may be launched, so that there are five inactive application servers 621. The previously mentioned counter may assign a counter value or similar manner of keeping count of when the inactive instance of b was initiated. In this case it will assign counter value 1 to the inactive instance of application b (622). The counter value of the inactive instance of application a from the previous step may increase to 2 (623).

Next, a user may send a command to the system that they want to run another instance of application b (624). The system includes an inactive instance of application b (625), where the inactive application server and inactive instance of application b may become active (626) in response to the command and may be used by the user for physics and or multiphysics simulation (627). Further, the system may load an inactive application b on an inactive application server (628), and launch another inactive application server 629 to maintain five inactive application servers the one that turned active. The counter value associated with the inactive instance of application a may remain at 2 (630), and the counter value associated with the inactive instance of application b may set to 1 (631). It is contemplated that the counter of the inactive instance of application a may be first increased to 3, while the counter of new inactive instance of application b is set to 1, there being initially no inactive instance with a value of 2. In a some preferred aspects, an additional check may be performed by the system, for each counter value, going from the counter value indicating the most recently loaded inactive instance of an application to the counter value indicating the least recently loaded inactive instance of an application (in this case going from 1 to 4), whether there is an inactive instance with the value. If there is no inactive instance with the value, the value will be assigned to the next inactive application determined by the check. In this case when the check reaches the value of 2, there is no inactive instance of an application, and the check will therefore change the counter value of inactive application a from 3 to 2. Alternatively a similar result could be achieved by the system not increasing the counter for broad instance distributions if the same type of instances of an application are started right after each other.

Next, a user may send a command to the system that they want to run an instance of application c (632). In a similar manner to what has been previously described, any inactive instance of application c which is present may turn active, and in some aspects, an instance of an application c may be loaded on an inactive application server, both of which will be made active for the user to use. An additional application server may be launched 633 by the system to maintain 5 inactive application servers. An inactive instance of an application c may be loaded onto an inactive application server 634, the inactive instance of an application c receiving a counter value of 1 (635), the counter of the inactive instance application b increasing to 2 (636) and the counter value of the inactive application a increasing to 3 (637).

Next, a user may send a command to the system that they want to run an instance of application d (638). In a similar way to what has been previously described, any inactive instance of application d which is present may turn active, and in some aspects, an instance of an application d may be loaded on an inactive application server (639), both of which will be made active for the user to use 640. An inactive instance of an application d may be loaded onto an inactive application server 641 with the inactive instance of an application d receiving a counter value of 1 (642), the counter of the inactive instance application c increasing to 2 (643), and the counter value of the inactive application b increasing to 3 (644). The counter value of the inactive instance of application a receives a value of 4. In this example, that means the inactive instance of application a is unloaded 645 from the inactive application server. An additional application server may be launched 646 by the system to maintain five inactive application servers.

The broad instance distribution example just described in the context of FIG. 7A includes inactive instances of applications b, c and d, with respective counter values 3, 2 and 1 (647).

In some aspects, the above example for the broad instance distribution could also be applied with each inactive application server being able to load two or more instances of inactive applications. In this case, if an inactive application server is turned active, only the instance of the application type requested by the user may be turned active. The other instances of applications are unloaded from the now active application server and restarted on one or more of the other inactive application servers and the counter values of the instances of inactive applications can be increased and checked as described above.

Figure 7B:
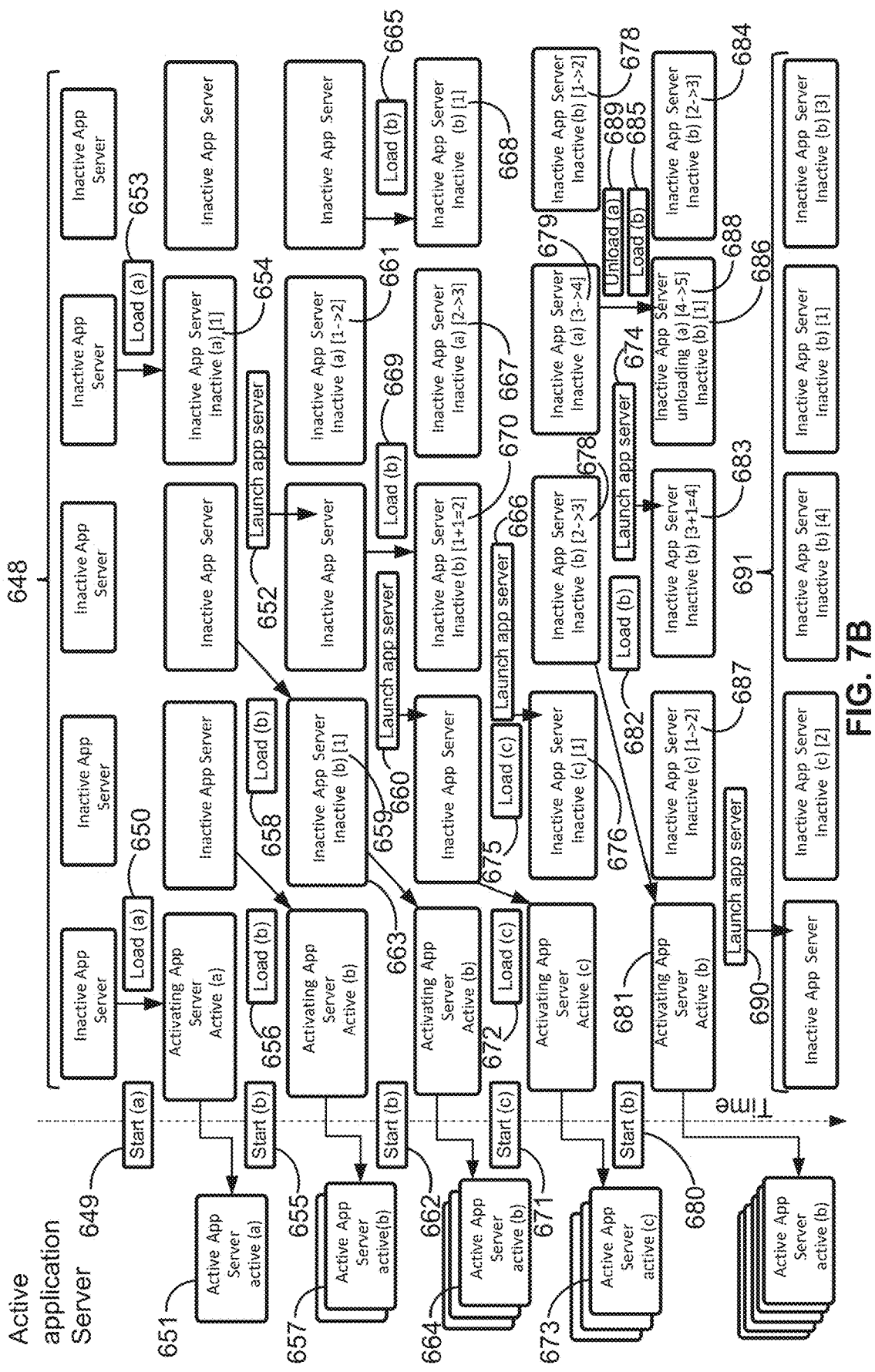
FIG. 7B illustrates an exemplary aspect for maintaining pre-loaded instances of inactive applications where the number of pre-loaded instances is proportional to how often the type of application has been started, according to aspects of the present disclosure.

Referring now to FIG. 7B, an exemplary proportional instance distribution is described including exemplary aspects of maintaining a number of pre-loaded instances of inactive applications, with the number of instances of each type of application standing in proportion to how often a type of application has been started. The exemplary system of FIG. 7B is illustrated with five inactive application servers 648, though more or fewer are contemplated. In some aspects, the system may run an arbitrary number of applications of various types, which are identified in this particular example as applications of type a, b, c, d and e. A user can send a command to start an instance of application a, (649). If there is an inactive instance of a available, then one of the inactive application servers including an inactive instance of a may turn active and the user may run the now active instance of application a. If no inactive instance of a is available, then an instance of a will be loaded onto one of the inactive application servers 650. The application server will turn active and the user can use the instance of application a (651). Another inactive application server may be launched, such that there are five inactive application servers available 652. If any inactive instances of applications are present on the system, the previously mentioned counter may increase their counter value by one. Additionally an inactive instance of a may be initiated by the system on one of the inactive application servers 653. In this case, a counter value 1 may be associated with the instance of the application a (654). The counter value may be updated as more applications are started. In this example the counter runs from a lower number to a higher number, but counting from a higher number to a lower number is also possible, in such a case the counter value is decreased instead. When the counter runs to 5 in this example, the inactive instance of the application is unloaded from the inactive application server.

Up to this step, the proportional instance distribution is similar procedure to the broad instance distribution. However in addition to loading an instance of application a with the counter value 1, if there had been an inactive instance of application a already present on the system, the inactive instance turning active, with a counter value of 3 or lower prior to the system receiving a command to start an instance of application a (that is, two counter values from obtaining a value causing the inactive application to be unloaded), an additional instance of application a, would be loaded onto an inactive application server, receiving the counter value of already present the inactive application a plus one.

Next, a user can send a command to the system to run an instance of application b (655). Similarly to what was described above, one of the inactive application servers may load an instance of b (656), turn active, and be used by the user (657). However if there is an inactive application server with an inactive instance of application b available, then the application server and instance of application b may turn active and be used. The command to start an instance of application b may, directly or indirectly, cause one of the inactive application servers, to load an inactive instance of b (658) with the instance of application b receiving a counter value of 1 (659). Another inactive application server may be launched (660), maintaining five inactive application servers. The counter value of the inactive instance of application a from the previous step may increase to 2 (661). If an instance of an inactive application b was turned active, the system may load an inactive instance of application b on one of the inactive application servers, and assign to the inactive instance of application b, a counter value which is equal to the counter value of the inactive instance of application b prior to turning active, plus 1.

Next, a user may send a command to the system to run another instance of application b (662). The system includes an inactive instance of application b (663) on an inactive application server where the inactive application server and inactive instance of application b may become active in response to the command and may be used by the user (664) for physics and or multiphysics simulation. Further, the system may load an inactive application b on an inactive application server (665) and launch another inactive application server (666) to maintain five inactive application servers. The counter value of the inactive instance of application a is increased to 3 (667) while the counter of new inactive instance of application b is set to 1 (668). As described previously, another inactive instance of application b is loaded on an inactive application server (669). The counter value of this inactive instance of application b is set to be equal to the counter value of the inactive instance of application b prior to activation, plus 1, that is, it is set to 2 (670). At this point, there is an inactive instance of application a (counter value 3), and two inactive instances of application b (counter value 1 and 2 respectively).

Next, a user may send a command to the system to run an instance of application c (671). In a similar manner to what has been previously described, any inactive instance of application c which is present may turn active, and in some aspects, an instance of an application c may be loaded on an inactive application server (672) such that both the instance of application c and the inactive application server may be made active for the user to use (673). An additional application server may be launched by the system to maintain 5 inactive application servers (674). An inactive instance of an application c may be loaded onto an inactive application server (675), the inactive instance of an application c receiving a counter value of 1 (676), the counter of the inactive instances of application b increasing to 2 (677) and 3 (678) and the counter value of the inactive application a increasing to 4 (679). As previously discussed, if there was an inactive instance of application c that was turned active, an additional inactive instance of c may be loaded on an inactive application server, The counter value of this exemplary hypothetical inactive instance of application c is set to be equal to the counter value of the inactive instance of application c prior to activation, plus 1.

Next, a user may send a command to the system to run another instance of application b (680). In a similar way to what has been previously described, one of the inactive instances of application b which is present may turn active 681. The inactive instance of an application b going from inactive to active, may be either the instance with a counter value of 3, or the instance with a counter value of 2. In this case the instance with a counter value of 3 prior to activation is turned active. An additional inactive instance of an application b is loaded 682 on an inactive application server, receiving a counter value of 4 (e.g., 3+1) (683). The counter value of the other inactive instance of application b is increased to 3 (684). An inactive instance of an application b may be loaded onto an inactive application server (685), the inactive instance of an application b receiving a counter value of 1 (686), the counter value of the inactive instance application c increasing to 2 (687), and the counter value of the inactive application a increasing to a counter value of 5 (688). In this example, that means the inactive instance of application a is unloaded 689 from the inactive application server. An additional application server may be launched 690 by the system to maintain five inactive application servers.

The proportional instance distribution just described in the context of FIG. 7B now has a distribution of inactive instances of applications that includes three inactive instances of application b (counter values 4, 3 and 1 respectively) and an inactive instance of application c (counter value 2) (691).

Figure 7C:
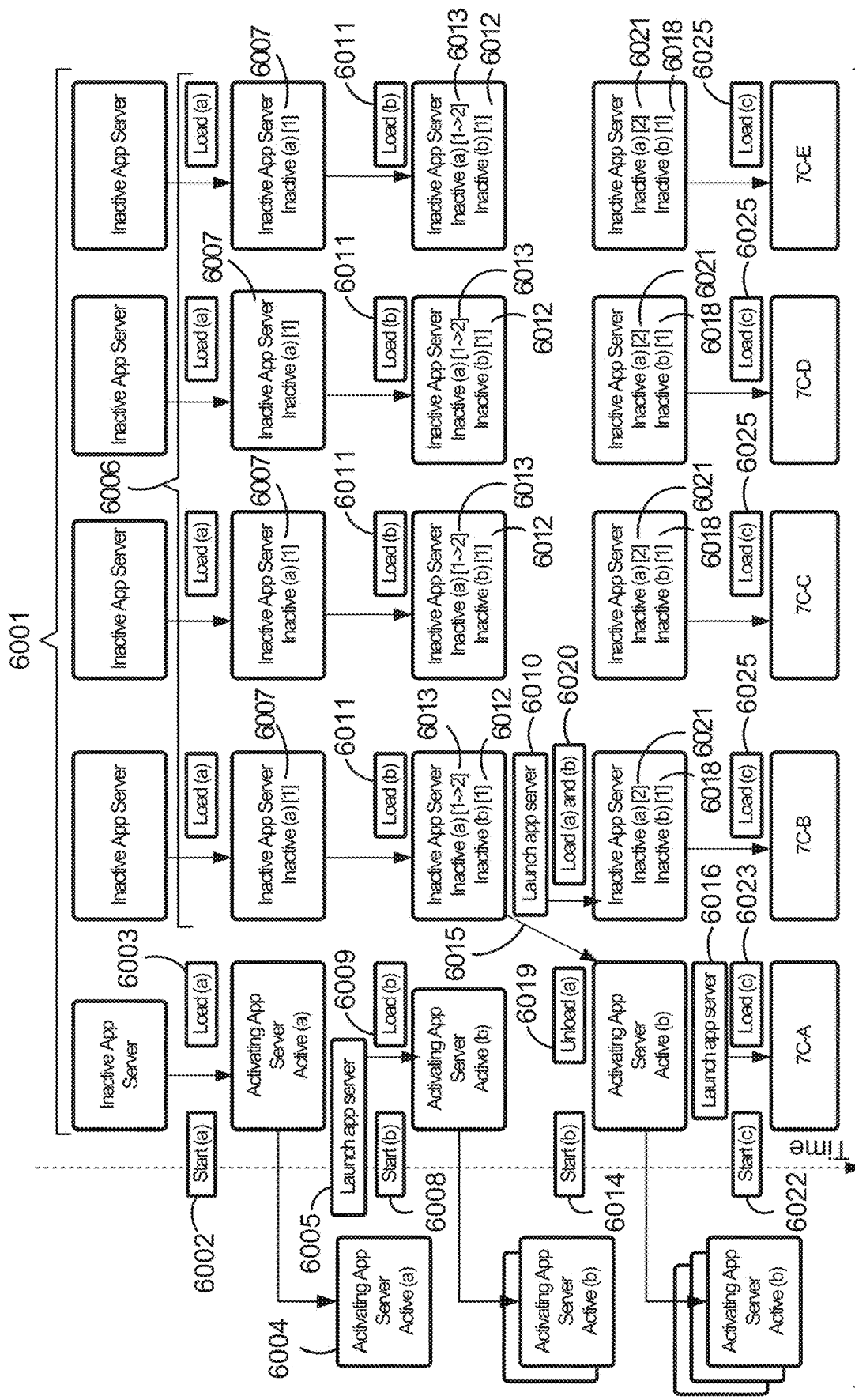
FIGS. 7C-7D illustrate an exemplary aspect for maintaining pre-loaded instances of inactive applications where several pre-loaded inactive instances of each type of application are pre-loaded and each instance of a specific type is pre-loaded onto different pre-launched application servers, according to aspects of the present disclosure.
Figure 7D:
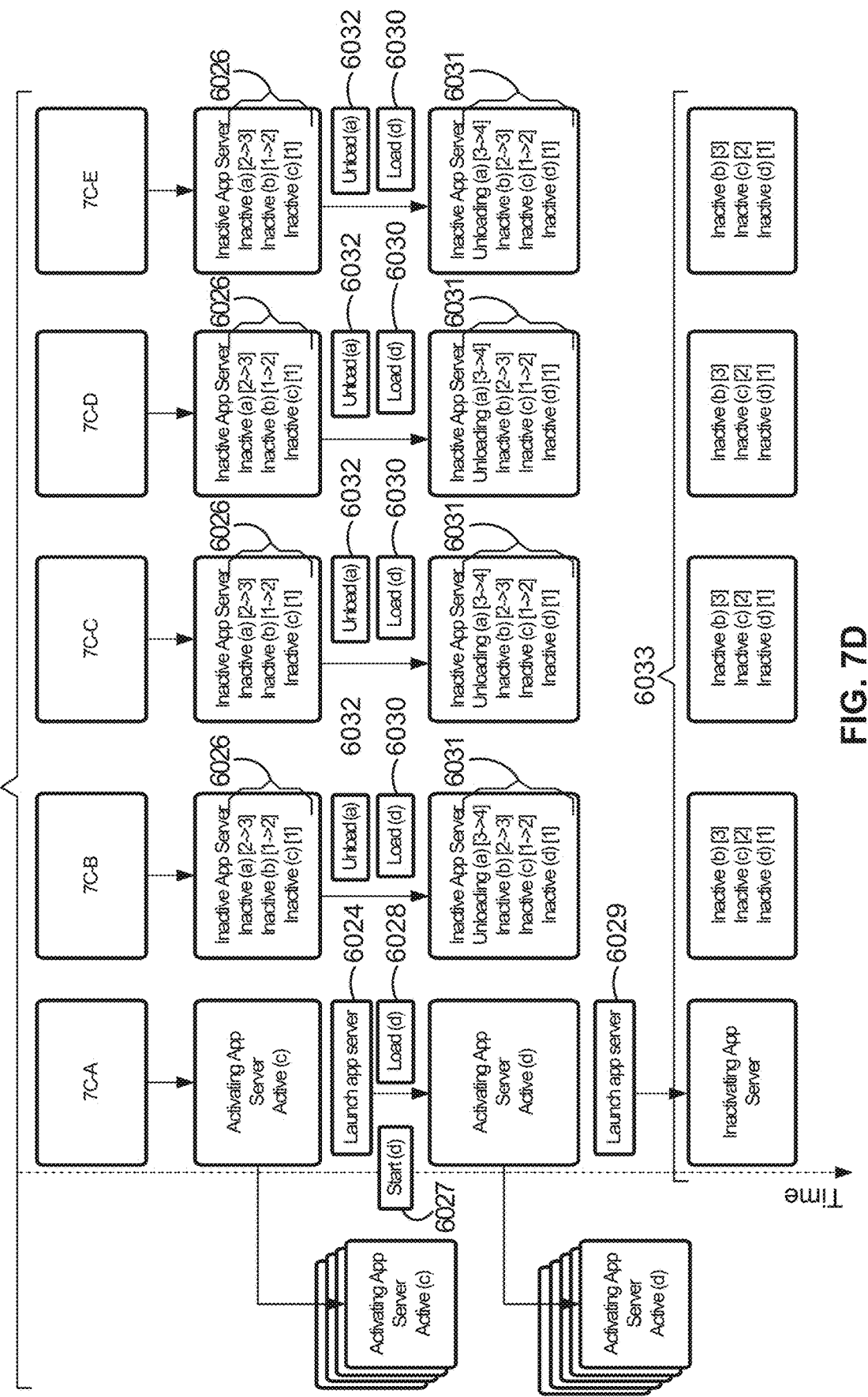

Referring now to FIGS. 7C-7D, an exemplary narrow instance distribution is described including exemplary aspects of maintaining a number of pre-loaded instances of inactive applications, with several pre-loaded inactive instances of each type of application being pre-loaded, each instance of a specific type being pre-loaded onto different pre-launched application servers. The exemplary system of FIGS. 7C-7D are illustrated with five inactive application servers 6001, though more or fewer are contemplated. The system may run an arbitrary number of applications of various types, and in this particular example, includes applications of type a, b, c, d and e. A user sends a command to start an instance of application a (6002), if there is an inactive instance of a available. Then one of the inactive application servers including an inactive instance of a may turn active and the user may run the now active instance of application a. If no inactive instance of a is available then an instance of a will be loaded onto one of the inactive application servers 6003, The application server may then turn active and the user may use said instance of application a (6004). Another inactive application server may be launched 6005, such that there are five inactive application servers available. An inactive instance of a may be initiated by the system on several or all of the inactive application servers 6006. If each inactive application server can only include one inactive instance of an application then no counter value is needed. If the inactive application servers may run more than one instance of an application, the system may set the counter value of all inactive instances of application a to 1 (6007). Similar to what was described for the broad instance distribution, it would be disadvantageous to have "gaps" in the counter values. For example, assuming that inactive instances with a counter value of 4 or higher are unloaded from the inactive application servers. Then there may be inactive instances with counter values 1, 2 and 3. The counter may use methods such as those described for the broad instance distribution, to assure that the case of having no inactive instances with counter value 2, but some with counter value 3 will not occur.

Next, a user may send a command to the system to run an instance of application b (6008). In a similar way to what has been previously described, if there are one or more inactive instances of application b, one of the instances, as well as the inactive application server on which it is loaded, may turn active. If no inactive instance of b is available, then an instance of b will be loaded onto one of the inactive application servers 6009. An additional inactive application server may be launched 6010, to maintain 5 inactive application servers. In this case, it is assumed the inactive application servers may each run more than one inactive instance of an application. As in the previous step, several or all of the inactive application servers may each load an inactive instance of application b (6011) with the inactive instances of application b all receiving a counter value of 1 (6012) and the counter value of the inactive applications a, increasing from 1 to 2 (6013). If there are already inactive instances of application b present on the application server, their counter values will be reset to 1, and it will only be necessary to load one additional inactive instance of application b onto an inactive application server.

Next, a user may send a command to the system to run another instance of application b (6014). There are one or more inactive instances of application b, and one of them, along with the application server on which it is loaded, may turn active 6015. An additional inactive application server may be launched 6016 (shown in FIG. 7D), to maintain five inactive application servers. In this case, it is assumed the inactive application servers may each run more than one instance of an application. Referring again to FIG. 7C, the system may load an additional inactive instance of application b on one of the inactive application servers 6017, and the inactive instance of application b, and all other inactive instances of application b may have their counter values set or set to 1 (6018). The now active application server that included the inactive instance of application b, also included an inactive instance of application a, which was unloaded 6019 when the application server was turned active, therefore an inactive instance of application a may be loaded (6020) to the inactive application server 6017 that loaded b. The counter value of the inactive applications a may be set to 2 (6021). This may be done in many ways—as a non-limiting example, by preventing the counter values to be increased if two instances of the same type are started directly after one another. As another non exhaustive example, the counter value for a may be set to 2 by performing a check to if there are gaps (that is, counter values not assigned to an inactive instance of an application in the sequence of counter values) reducing the counter value of all inactive instances with a counter value above the gap, if any such inactive instances are present.

Referring now to FIG. 7D, a user may next send a command to the system to run an instance of application c (6022). In a similar way to what has been previously described, if there are one or more inactive instances of application c, one of them, as well as the inactive application server on which it is loaded may turn active. If no inactive instance of c is available, then an instance of c will be loaded onto one of the inactive application servers 6023. An additional inactive application server may be launched 6024, to maintain 5 inactive application servers. In this case it is assumed the inactive application servers may each run more than one instance of an application. As in the previous step, several or all of the inactive application servers may each load an inactive instance of application c (6025), with the inactive instances of application c all receiving a counter value of 1, and the counter value of the inactive applications a increasing from 2 to 3, and the counter value of the inactive instances of application b increasing from 1 to 2 (6026). If there are already inactive instances of application c present on the application server, their counter values will be reset to 1, and one additional inactive instance of application c is loaded onto an inactive application server.

Next, a user may send a command to the system to run an instance of application d (6027). In a similar way to what has been previously described, if there are one or more inactive instances of application d, one of them, as well as the inactive application server on which it is loaded may turn active. If no inactive instance of d is available then an instance of d will be loaded onto one of the inactive application servers 6028. An additional inactive application server may be launched 6029, to maintain 5 inactive application servers. In this case it is assumed the inactive application servers may each run more than one instance of an application. As in the previous step, several or all of the inactive application servers may each load an inactive instance of application d (6030) with the inactive instances of application d all receiving a counter value of 1, and the counter value of the inactive applications a, increasing from 3 to 4, with the counter value of the inactive instances of applications b increasing from 2 to 3, and the counter values of inactive instances of application c increasing from 1 to 2 (6031). The counter value of the inactive applications a, increasing from 3 to 4 may cause the inactive instances of application a to be unloaded from the inactive application servers 6032. If there are already inactive instances of application d present on the application server, their counter values will be reset to 1, and one additional inactive instance of application d will be loaded onto an inactive application server.

The narrow instance distribution just described in the context of FIGS. 7C-7D now have all or several of the application servers each including an instance of application b, c and d, with respective counter values of 3, 2 and 1 (6033).

Figure 7E:
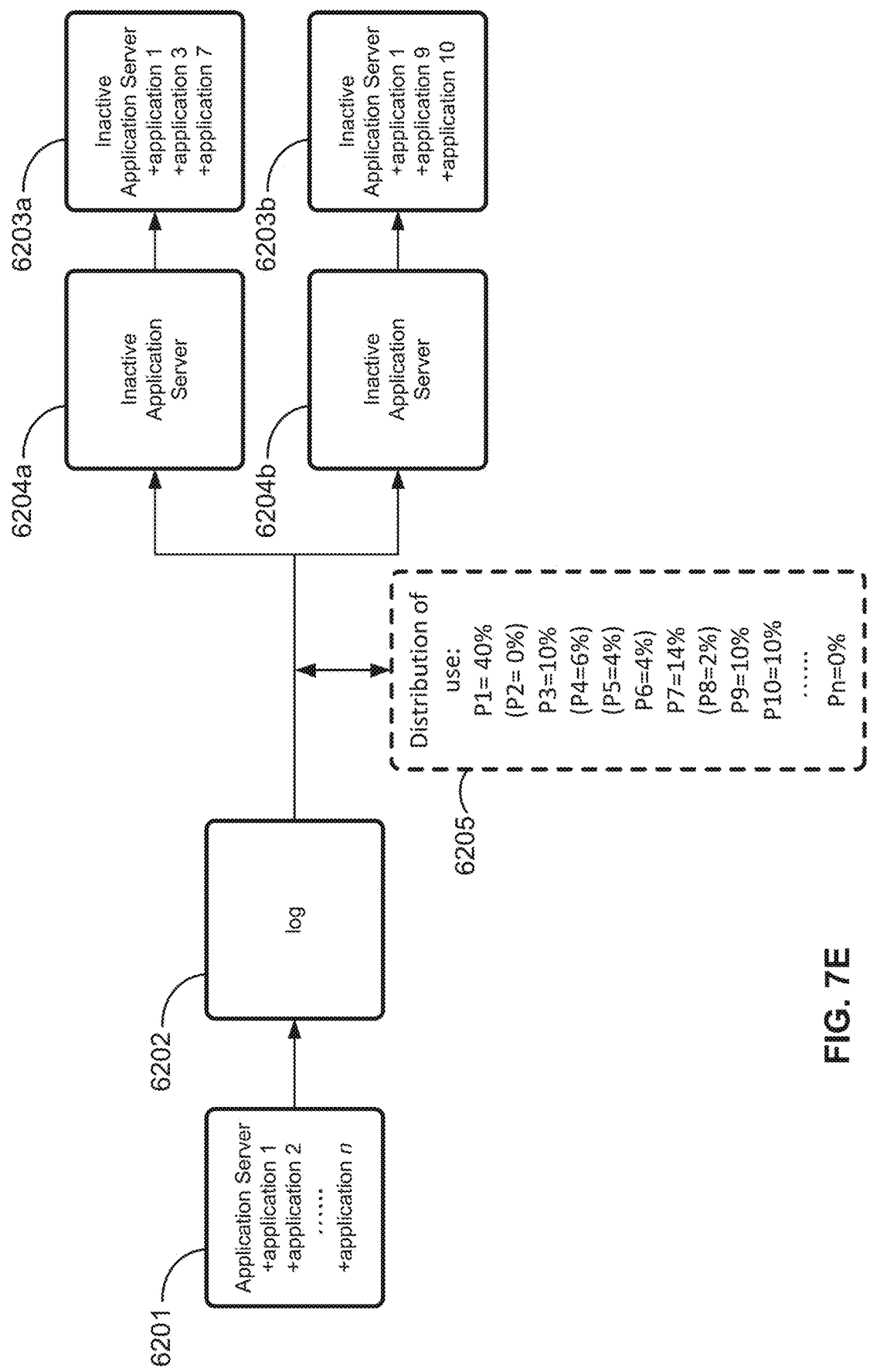
FIG. 7E illustrates an exemplary aspect a system including a plurality of available physics modeling applications where the system records usage and other events, according to aspects of the present disclosure.

Referring now to FIG. 7E, an exemplary system is illustrated including a plurality of available physics applications 6201, where the system records usage and other events such as users logging into the system, in one or more system logs 6202. It is contemplated that the type of and how many inactive instances of physics modeling applications 6203a-b are loaded on inactive application servers 6204a-b can be based at least in part on the system reading the one or more system logs 6202. Computer systems often include logs, with information such as data associated with various events, including what applications are started and ended, who logs in or out of the system and when these events occur, etc. The system may use such data from the logs to decide what inactive instances of applications should be pre-loaded on one or more inactive application servers. The system may read all or parts of the log, either in response to some event, such as, but not limited to, a user logging in to the system or the user starting an instance of an application, or the system may read all or parts of the log at various time intervals.

It is also contemplated that optionally the system may also maintain a probability distribution of use of physics applications 6205. This may for example allow the system to read only certain events, such as what applications have been run and what users ran the applications in the log, that are new since the system last read the log, as opposed to re-reading the old parts of the log. Then in accordance with what was read in the log, the system may modify the probability distribution. For example, if the system reads in the log that one or more instances of an application 1 was started, the system may increase the recorded probability of application 1 having been started, where the probability increasing may cause the system to pre-load additional inactive instance(s) of application 1, and/or unload one or more inactive instances of other applications.

The aspects described for FIG. 7E can be advantageous because the distribution of instances of inactive applications may be created or modified retroactively, based on existing logs.

If application servers and instances of applications are distributed over more than one computing systems or processes, computational load balancing may be taken into consideration. If more than one application server is used, memory use, storage use, and CPU utilization may be distributed as equally as possible over said computing systems or processes.

To facilitate load balancing, it may be advantageous to distribute the inactive application servers and instances of applications onto the computing systems in accordance with their computational load capacity. A computing system with a higher computational load may close an inactive application server, and a new inactive application server may be launched on another server (which has a lower computational load) with the same types of inactive instances of applications loaded. In addition, it may be advantageous to try to achieve an even load distribution by having active instances of applications running on different computing systems, as opposed to having several active instances of applications running on one computing system and no active applications running on another computing system.

Figure 8:
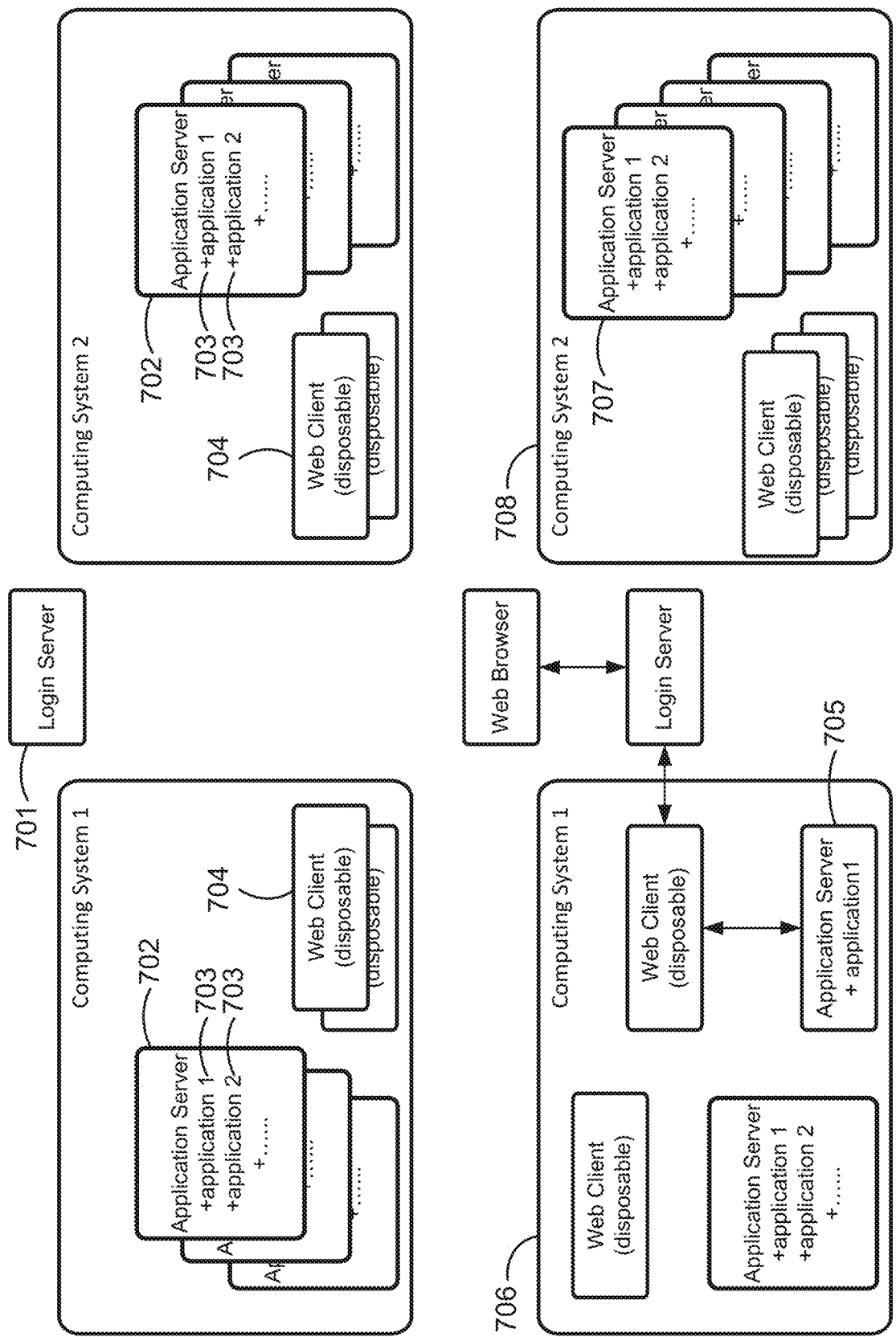
FIGS. 8-9 illustrate exemplary aspects of load balancing across multiple computing systems, according to aspects of the present disclosure.
Figure 9:
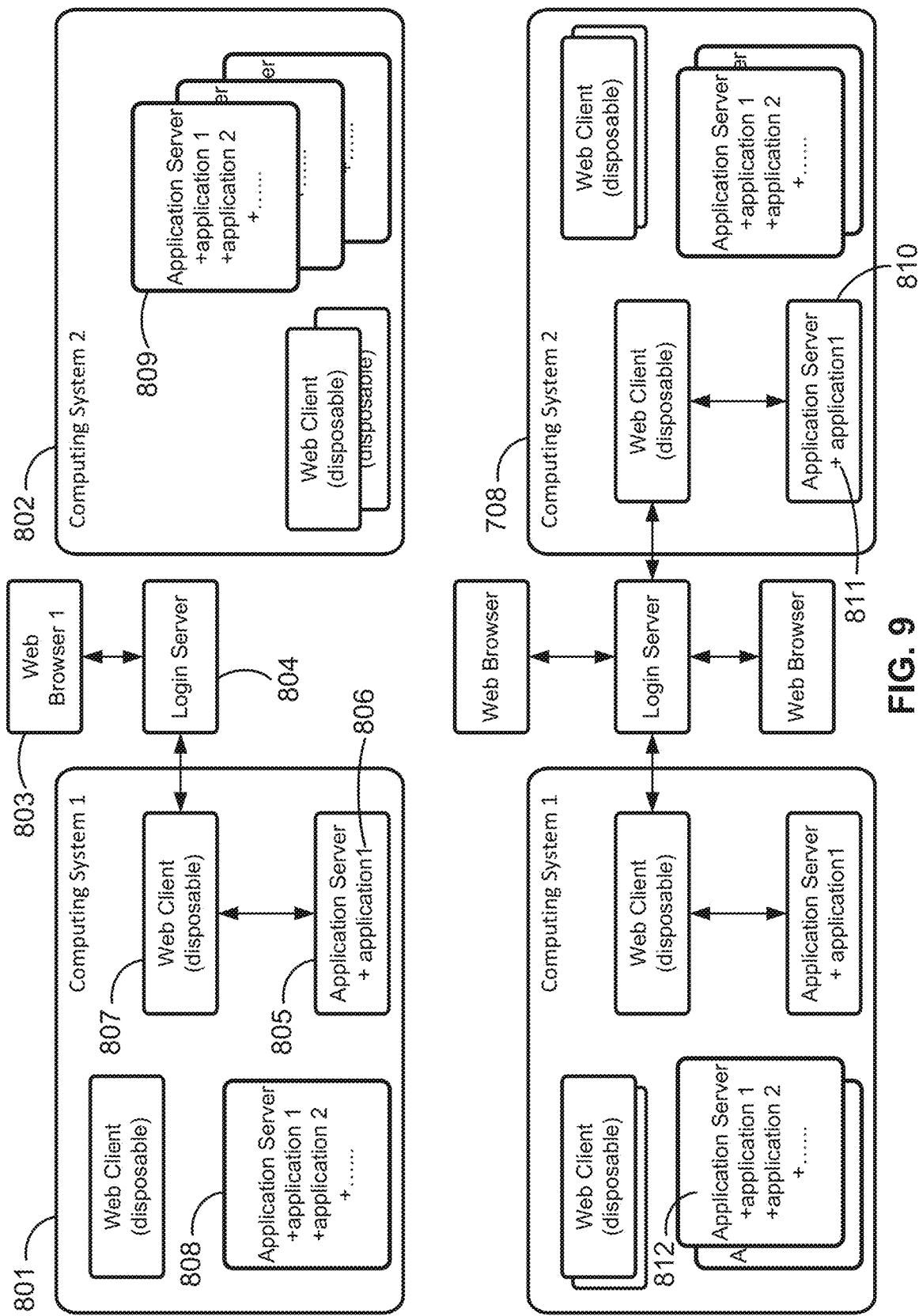

Referring now to FIGS. 8 and 9, exemplary aspects of load balancing across multiple computing systems are illustrated. In FIG. 8, a login server 701, a plurality of inactive application servers 702, including one or more inactive instances of applications 703, and optionally web clients (704), are distributed in such a way that the computational load on computing system 1 and computing system 2 are uniform. A user logs in and selects an application, turning an inactive application server and an inactive instance of an application into an active state 705 on computing system 1 (706). One or more application servers and applications are shut down on computing system 1 in anticipation of an increased computational load, or in response to an actual increased computational load as the user runs the active instance of the application. As a consequence of shutting down one or more application servers, the computational load is decreased on computing system 1.

Shutting down an inactive application server and applications may cause the system to deviate from the prescribed number of inactive application servers and inactive instances of applications. This may be alleviated by launching an inactive application server 707, and loading instances of the same inactive applications that were shut down on computing system 1, onto computing system 2 (708) instead. Such launching and loading may occur in response to the one or more inactive application servers being shut down on computing system 1.

Referring to FIG. 9, another exemplary system is illustrated including two computing systems, computing system 1 (801) and computing system 2 (802). A user may be logged on to computing system 1 through a client 803 and a login server 804 running a first active application server 805, a first active instance of an application 806, and optionally a web client 807. In addition, computing system 1 may include one or more inactive application servers including one or more inactive applications 808. As previously described in FIG. 8, computing system 2 may include more inactive application servers and instances of applications 809 to improve computational load balancing.

A user in the example of FIG. 9 may select to run a second instance of an application. In response, a second application server 810, including a second instance of an application 811 may turn from an inactive to an active state and the user may run a simulation using the second application server and second instance of an application. It may be advantageous to run the second active application server and application on a computing system including the least amount of active applications, or on the computing system using the lowest amount of CPU resources. The system may detect which available computing system includes the least amount of active application servers and applications or which computing system that uses the least amount of CPU and/or memory resources. In this case that is computing system 2. Thus the second active application server and application will run on computing system 2. If computing system 2 includes more inactive application servers and applications, this may result in a higher computational load on computing system 2, than on computing system 1. The system may detect this and shut down one or more inactive application servers, including one or more inactive applications, on computing system 2, and restart said inactive application servers and applications (812) on computing system 1.

Several licensing schemes are contemplated for running and using physics modeling applications. In some aspects, a license is not required to run or use an application. In some aspects, one or more licenses are required to use a physics modeling application, that is, for an instance of an application that is active, but not for an unused instance of an application, that is, for an inactive application. Yet in other aspects, one or more licenses are needed both for inactive applications and for active applications.

In yet further aspects, a license scheme may include that only one type of license is required, regardless of the type of application that is used. In yet additional aspects, some applications may require specific licenses, in addition to a generic application license. The type of specific license required may depend on the type of application. For example, a physics application for simulating loads on a steel beam may require a structural mechanics license, in addition to a generic application license. In another example, a physics application for simulating heat transfer in a steel beam may require a heat transfer license, in addition to a generic application license. In a further example, a multiphysics application that simulates elastic deformation of a beam that is being heated may require both a structural mechanics license and a heat transfer license, in addition to a generic application license.

It may be desirable to have a generic application license and additional application specific licenses. It may also be desirable that only active applications require licenses, and the system may then allow users to purchase licenses specific to their needs. For the purpose of speeding up the startup time of applications, users are limited only by how much computer resources they are willing to allocate to running inactive application servers and inactive applications.

Figure 10:
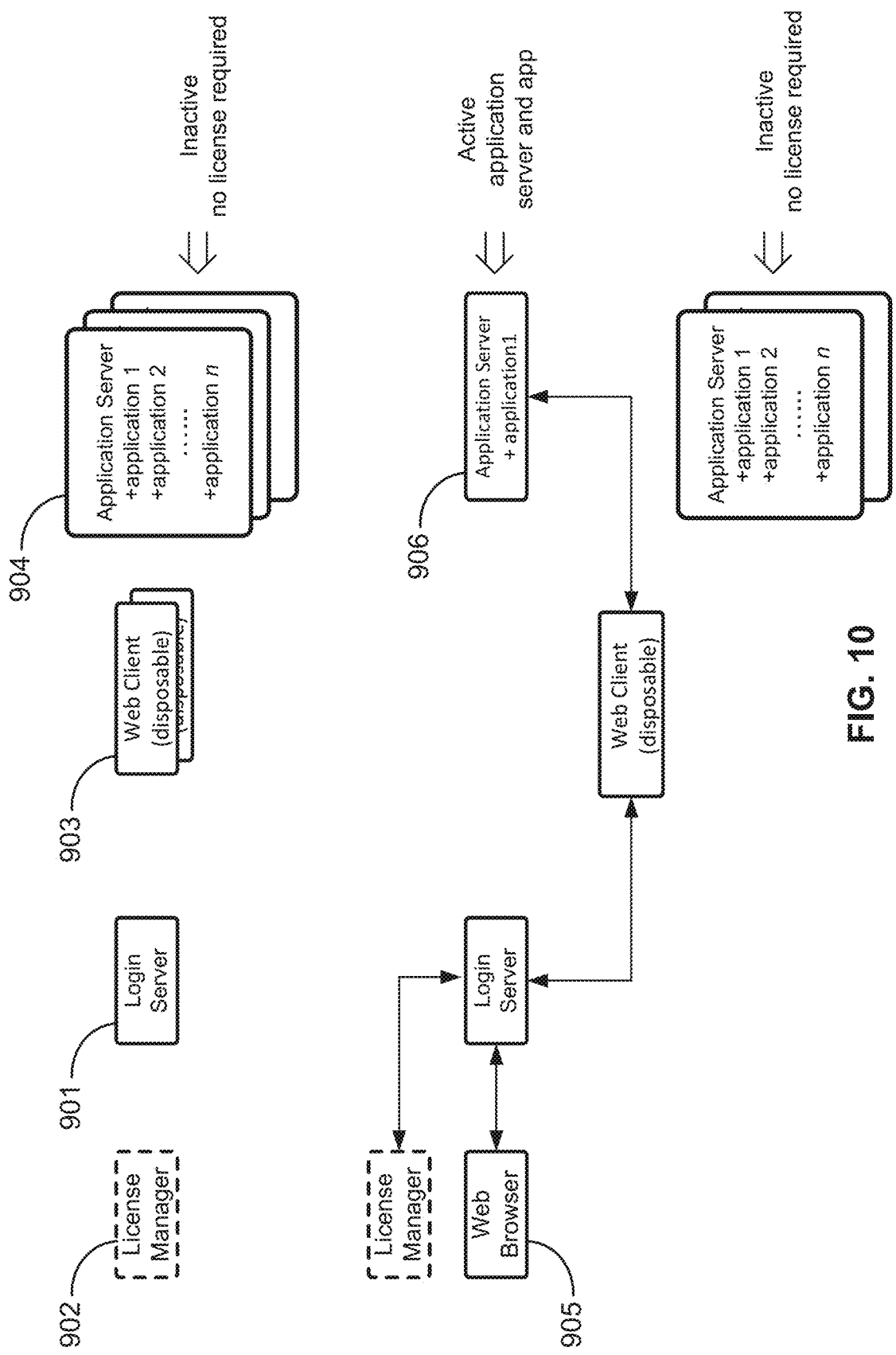
FIG. 10 illustrates exemplary aspects of license requirements for (i) active application servers and applications and (ii) inactive application servers and applications, according to aspects of the present disclosure.

FIG. 10 illustrates exemplary aspects of license requirements for (i) active application servers and applications and (ii) inactive application servers and applications. A login server 901, a license manager (902), optional web clients 903, and one or more inactive application servers including one or more inactive instances of applications 904 are illustrated. In some aspects, neither the inactive instances of applications nor the inactive application servers require a license to run. A user may log in to the system, in this case using a web browser 905, and select an application to run. In response to the user selecting an application, an inactive application server and an instance of the selected application may turn active 906, checking out one or more required licenses from the license manager.

It may be desirable to use a licensing system where the number of licenses limits the number of concurrent users of applications. For example, a user may have purchased four generic application licenses, allowing four concurrent users of applications. The customer may in addition have bought two solid mechanics licenses, allowing at the most two of the four concurrent users to run applications requiring a solid mechanics license at the same time. There may also be a limit to the number of instances of applications a single user may use at any one time. For example, in one non-limiting aspect, a single user may be limited to running no more than instances of any applications than they have licenses at any time.

Figure 11:
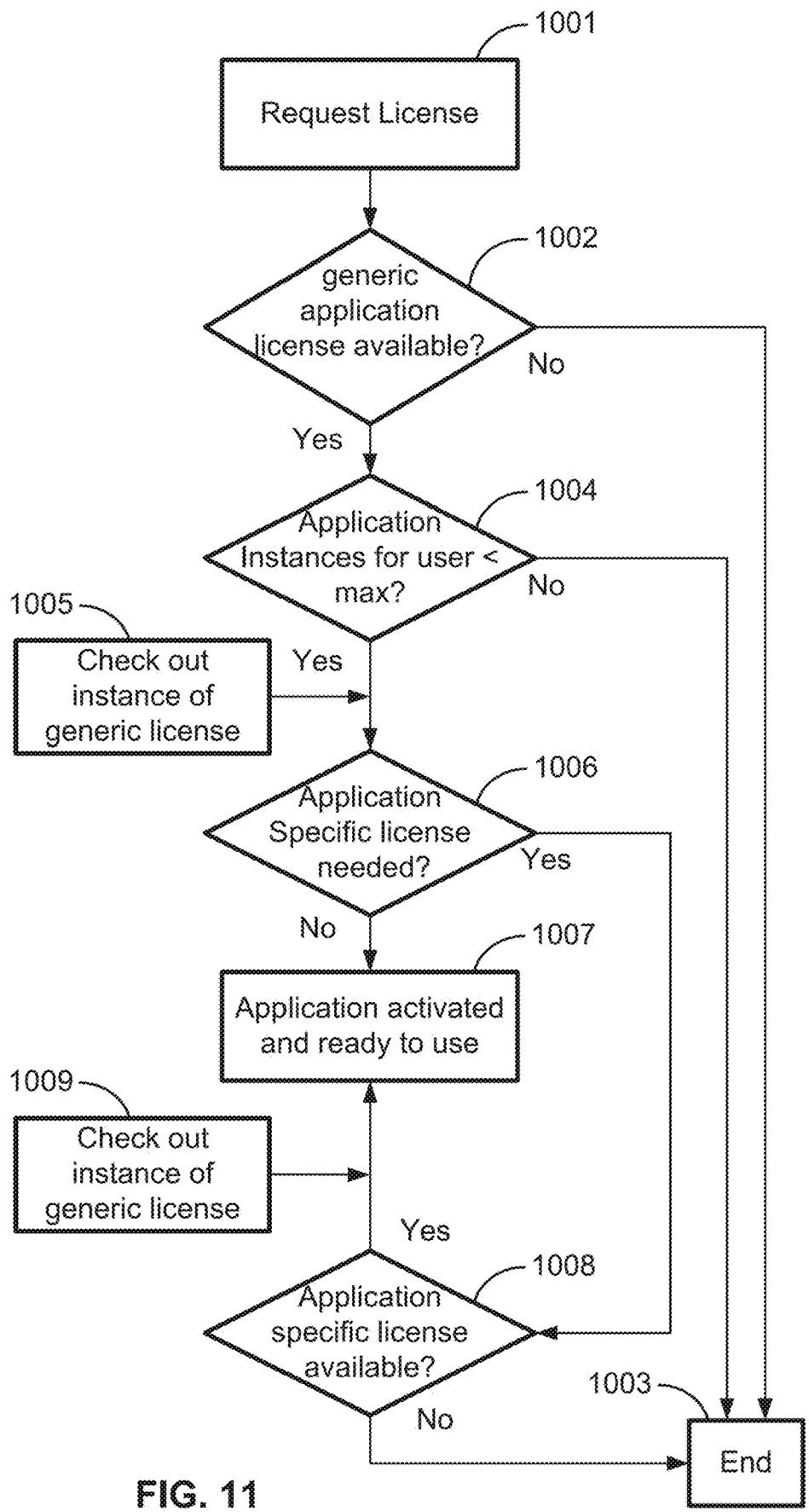
FIG. 11 illustrates an exemplary aspect of a process for checking out licenses for applications, according to aspects of the present disclosure.

Referring now to FIG. 11, an exemplary aspect is illustrated of a process for checking out licenses for applications. The method illustrates requesting (e.g., checking out) generic application licenses, specific licenses, and for controlling the number of applications run concurrently by any one user. At step 1001, a user may log onto a system and then select an application where the application may then request a generic application license from a license manager. At step 1002, the license manager may check to see if a license is available. In some aspects, such a check may compare the number of available licenses compared to the number of licenses checked out by different users, as identified, for example, by a host ID of the user. If no license is available, then at step 1003, the method will exit. If a license is available, the method proceeds to step 1004 where the system may control whether the user is allowed to run the instance of the application, or if the user running the instance of the application would result in the user exceeding the number of instances of applications the user is allowed to run simultaneously. In some aspects, step 1004 may include comparing the number of instances of the license, as identified by the user's host ID, that the user has checked out to a number specifying the maximum amount of instances of applications per user. If the user is not allowed to run another instance of an application, the process will proceed will proceed to step 1003 and exits. If the user will not exceed the user's maximum amount of active instances of applications, then an instance of a generic license may be checked out from a license manager at step 1005. Checking out the instance of a generic license decreases the number of available generic licenses by one, if no instance of a generic license was previously checked out by the host ID. Next, at step 1006, a check will be made if the application needs one or more specific licenses. If no specific license is needed, the user may start using the instance of the application, and the application is turned active at step 1007. If the application requires an application-specific license, such a license is requested from the license manager at step 1008, provided such a license is available, and an instance of such a license is checked out at step 1009. If no such specific license is available, the process proceeds to step 1003 and exits. According to some aspects, it may also be desirable to release the generic license checked out previously at step 1005 when the application specific license is not available.

At step 1009, checking out the instance of a specific license decreases the amount of available such instances of specific licenses by one, if no instance of a specific license was previously checked out by the host ID. Once all required specific licenses are checked out, an inactive application server including an instance of the selected application may turn into an active application server including an active instance of the selected application. The user may now use the active instance of the application to run a physics or a multiphysics simulation.

In some aspects, a license may only be required for a user to actively use an instance of an application, such as for performing one or more of the following actions: using solvers, meshing a geometry, or inputting parameters or variables.

On shutting down an instance of an application, the instances of the licenses are checked in to the license manager, and the application server and the instance of the application may go back to an inactive mode or may be shut down (or go into a hibernating mode), depending on the proscribed number and types of inactive instances of applications that should be running on the system.

Similarly to how the system keeps track of the frequency of use of various applications, the system may keep track of the frequency of use of different license types and, for example, be able to report the number of times when all application licenses of a specific type have been in use, or when all generic user licenses have been use. This could help a user identify if they need more licenses, and which type of licenses they need the most.

As an alternative to an instance of an application going into an inactive state or being shut down when a user exits an application, a user who runs an application may want to stop using the application, saving the state of the instance of the application, and resume using the instance of the application later, with the instance of the application in the same state as when the user stopped using the application. An instance of an application saved in this way may be referred to as a hibernating application. Having an instance of an application hibernating may be beneficial, as it saves the time of loading the instance of the application again, and in addition it saves the user the time required to input settings, parameters etc. into the application.

The number of instances of applications allowed to hibernate may depend on the number of available licenses. In some aspects, a hibernating instance of an application requires a license, similar to how an active instance of and application requires a license. In some aspects, a certain number of hibernating instances of applications up to a threshold may be allowed, where the threshold may depend on the number of licenses present on the system. In some aspects, hibernating instances of applications do not require a license.

A hibernating application can increase computer load and may require a license. Therefore, in some aspects, it may be beneficial for an administrator or a superuser to be able to set when a hibernating application should be shut down. Some exemplary options include: (i) a hibernating application is shut down after a certain time period; (ii) a hibernating application is shut down at a certain time of day, for example a certain time after normal office hours; (iii) a hibernating application is shut down depending on date, for example once the weekend starts; or (iv) a hibernating application is not shut down unless it is shut down manually.

It is contemplated that if a hibernating application requires licenses, the licenses are checked in once the application is shut down. If a user does not want an instance of an application to hibernate, another option is that when a user, for example, logs out, the application is returned to a default state, such as becoming an inactive application.

Figure 12A:
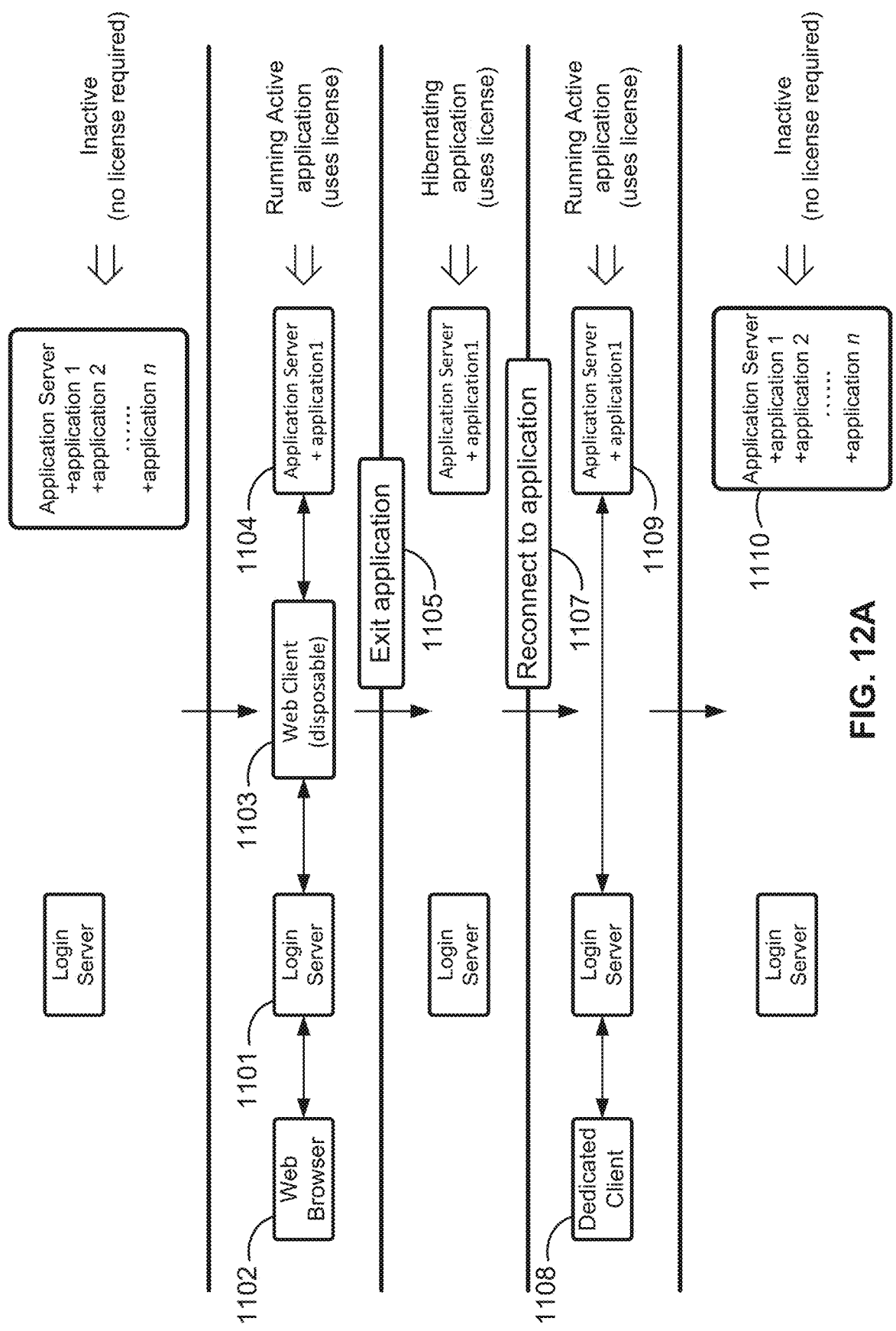
FIGS. 12A-12B illustrate exemplary aspects of hibernating applications, according to aspects of the present disclosure.
Figure 12B:
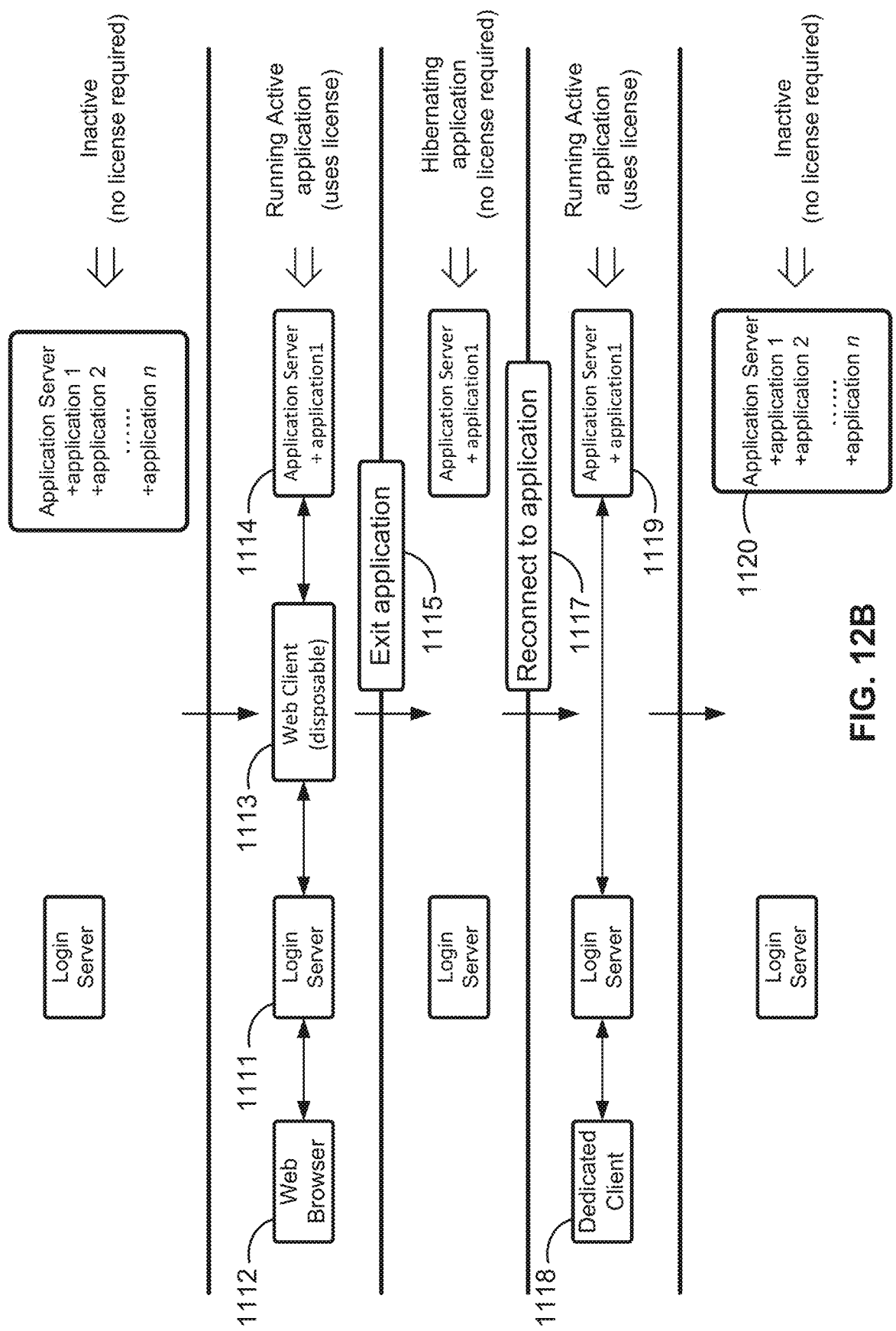

Turning now to FIGS. 12A-12B, exemplary aspects of hibernating applications are illustrated. In FIG. 12A, a user may log on to a system through a login server 1101 and select an application to run. The user may use a terminal or a web browser 1102 on a computer, pad, or telephone. In some aspects, the user connects to the computing system through an optional web client 1103 and to an application server including an instance of an application 1104. As previously described, the startup time of the application may be reduced through the use of inactive application servers including inactive applications. The user runs the application in an active state, possibly requiring one or more licenses to do so. The user may then exit the application 1105 turning the application into a hibernating state 1106, storing the instance of the application, where the hibernating application may require a license. Later the user may reconnect to the hibernating application 1107, through, for example, a dedicated client 1108, that may be located on a different terminal than when the user first connected to the application. In response to the user reconnecting to the hibernating application, the application will return to an active state 1109 with the instance including the same settings and data as when the user previously exited the application. The user may then shut down the application, turning the application server and the application to an inactive state 1110.

In FIG. 12B, a user may log on to the system through a login server 1111, selecting an application to run. The user may use a terminal or a web browser 1112 on a computer, pad, or telephone. In some aspects, the user connects to the computing system through an optional web client 1113 to an application server including an instance of an application 1114. As previously described, the startup time of the application may be reduced through the use of inactive application servers including inactive applications. The user runs the application in an active state; in some aspects, requiring one or more licenses to do so. The user may then exit the application 1115 transitioning the application into a hibernating state 1116 that stores the state of the instance of the application, with the hibernating application not requiring a license. The instance(s) of whatever licenses had been checked out are returned to the license server. Later the user may reconnect to the hibernating application 1117, in this example through a dedicated client 1118, located on at a different terminal than when the user first connected to the application. In response to the user reconnecting to the hibernating application, the application will return to an active state, if there are available instances of the required licenses 1119. The instance includes the same settings and data as when the user previously exited the application. The user may then shut down the application, transitioning the application server and the application to an inactive state 1120.

Some examples of systems using the above described systems and methods will now be described in the context of FIGS. 13-20.

Figure 13:
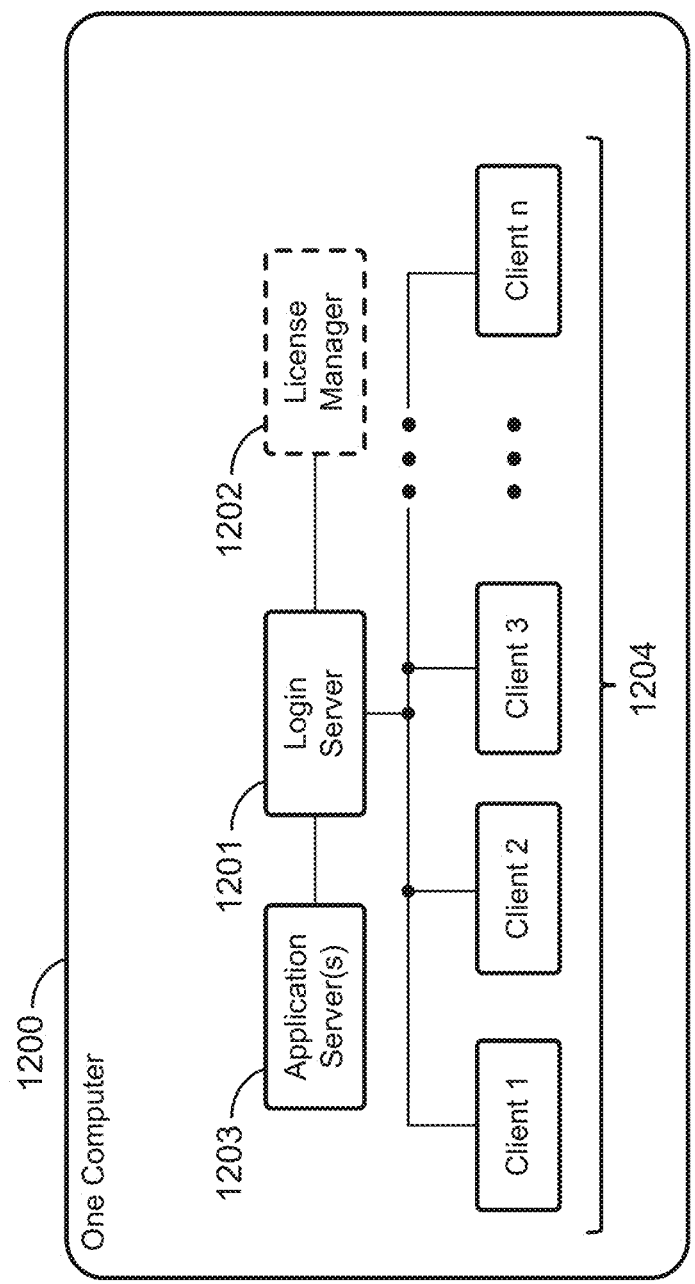
FIG. 13 illustrates an exemplary usage scenario based on system components being located on a single computing system, according to aspects of the present disclosure.

FIG. 13 illustrates an exemplary usage scenario based on system with components being located on a single computing system, according to aspects of the present disclosure. The system of FIG. 13 includes a login server 1201, a license manager 1202, and one or more active and/or inactive application servers 1203, including one or more active and/or inactive instances of applications, and one or more clients 1204. The system is part of a single computer system.

Figure 14A:
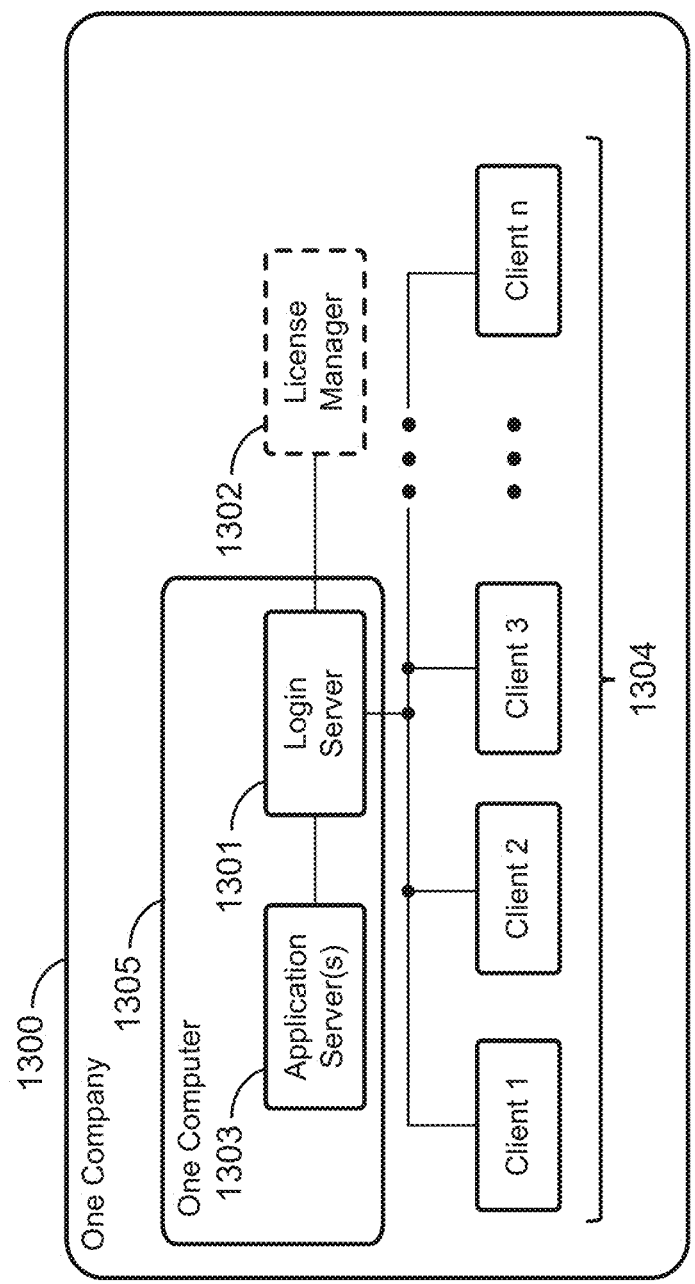
FIG. 14A-14B illustrate exemplary usage scenario based on system components being located within a local area or private network, according to aspects of the present disclosure.
Figure 14B:
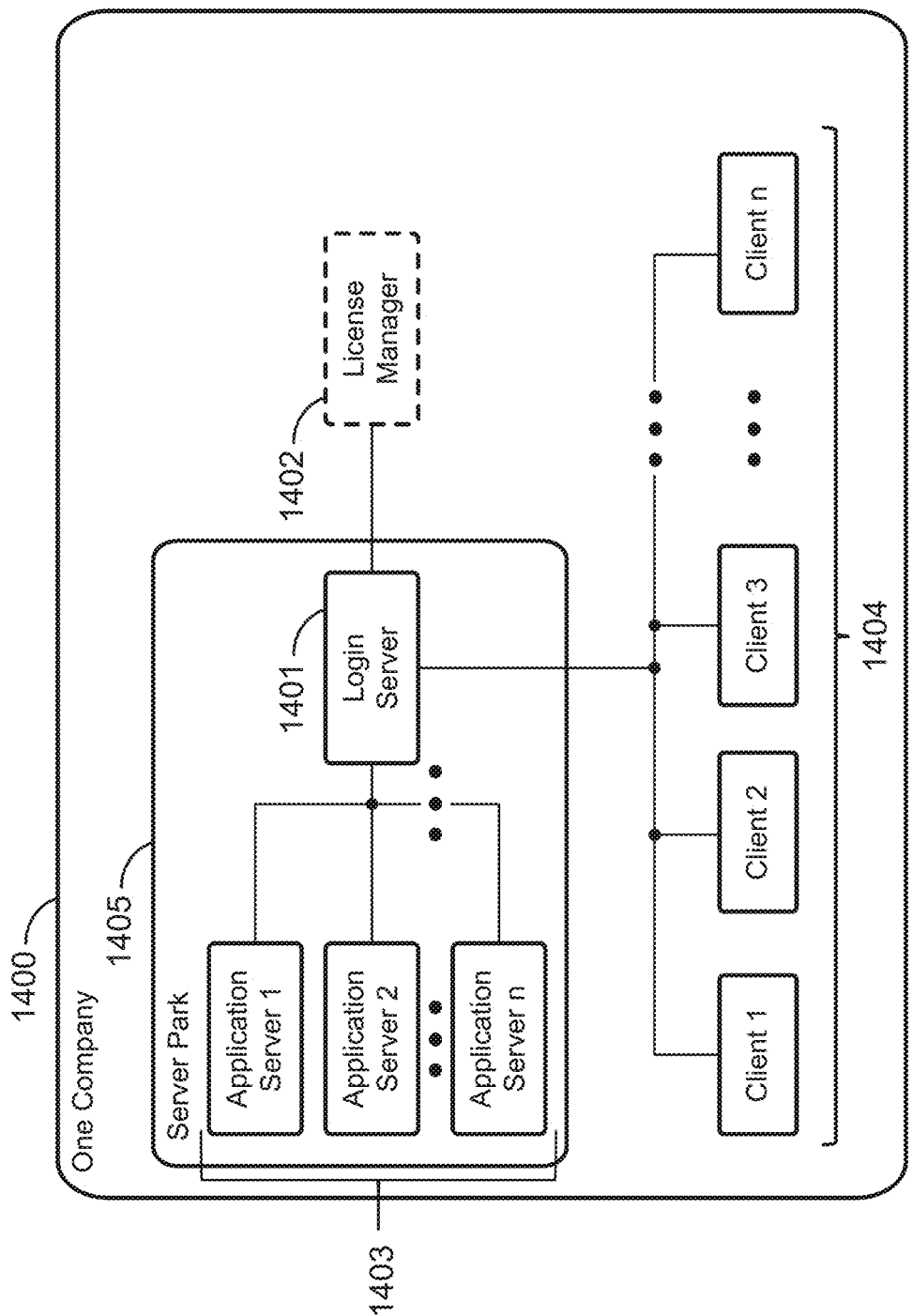

FIG. 14A-14B illustrate exemplary usage scenario based on system components being located within a local area or private network, according to aspects of the present disclosure. The system 1300 of FIG. 14A includes a login server 1301, a license manager 1302, one or more active and/or inactive application server(s) 1303 including one or more active and/or inactive instances of applications, and one or more clients 1304. The login server and one or more application server(s) are located on a first computer system 1305. The one or more clients are located on one or more second computer systems or terminals. The license manager is located on a third computer system. All computer systems for the system of FIG. 14A are located within the same company or organization. The system 1400 of FIG. 14B includes a login server 1401, a license manager 1402, one or more active and/or inactive application servers 1403 including one or more active and/or inactive instances of applications, and one or more clients 1404. The login server and one or more application server(s) are located on one or more computer or server systems in a server park 1405. The one or more clients are located on second computer systems or terminals, and the license manager is located on a third computer system, within or outside the server park. Similar to the system of FIG. 14A, all computer systems of FIG. 14B are located within the same company or organization.

FIG. 15 illustrates an exemplary usage scenario where application server(s) are located on cloud computing nodes and connected to a login server, clients, and a license manager, all located within a local area network or within an a private network, according to aspects of the present disclosure. The system 1500 of FIG. 15 includes a login server 1501, a license manager 1502, one or more active and/or inactive application servers 1503 including one or more active and/or inactive instances of applications, and one or more clients 1504. The one or more application server(s) are located on one or more cloud compute nodes 1505. The one or more clients are located on second computer systems or terminals, and the license manager is located on a third computer system, which may or may not be a cloud compute node. All computer systems and cloud compute nodes for system 1500 are located within the same company or organization intranet.

Figure 16:
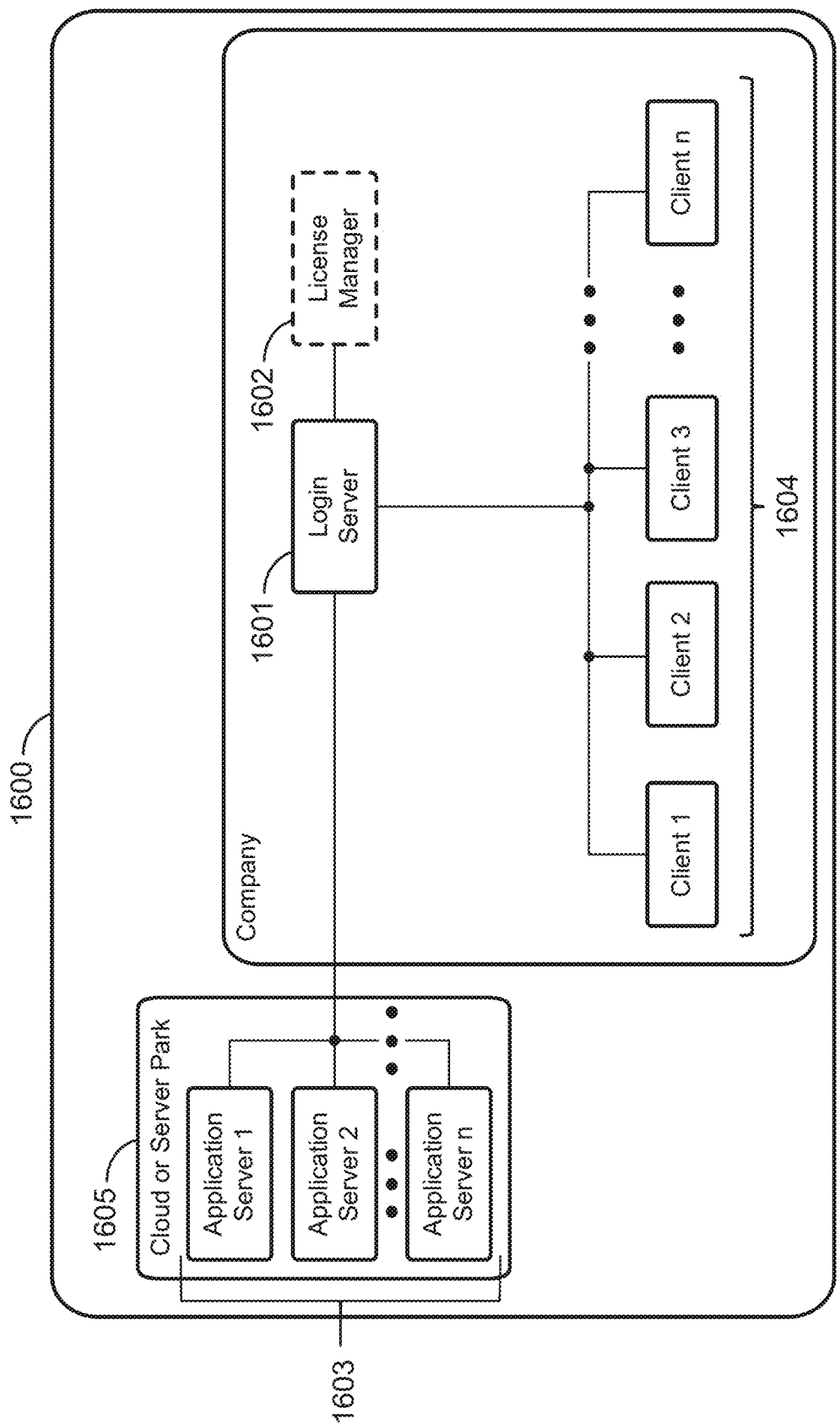
FIG. 16 illustrates an exemplary usage scenario where application server(s) are located on cloud computing nodes or on servers in a server park, and connected to a login server, clients, and a license manager, where all components but the application server(s) located within a local area network or a private network, and the application servers are located on external cloud computing nodes or an external server park, according to aspects of the present disclosure.

FIG. 16 illustrates an exemplary usage scenario where application server(s) are located on cloud computing nodes or on servers in a server park, and connected to a login server, clients, and a license manager, where all components but the application server(s) located within a local area network or a private network, and the application servers are located on external cloud computing nodes or an external server park, according to aspects of the present disclosure. The system of FIG. 16 includes a login server 1601, a license manager 1602, one or more active and/or inactive application servers 1603 including one or more active and/or inactive instances of applications, and one or more clients 1604. The one or more application server(s) are located on one or more cloud compute nodes or in a server park 1605. The one or more clients 1604 are located on second computer systems or terminals. The license manager 1602 is located on a third computer system, which may or may not be a cloud compute node. The application servers 1603 are located on cloud compute nodes or in a server park 1605, outside a company or organization. The login server 1601, license manager 1602, and clients 1604 are located within the company or organization.

Figure 17:
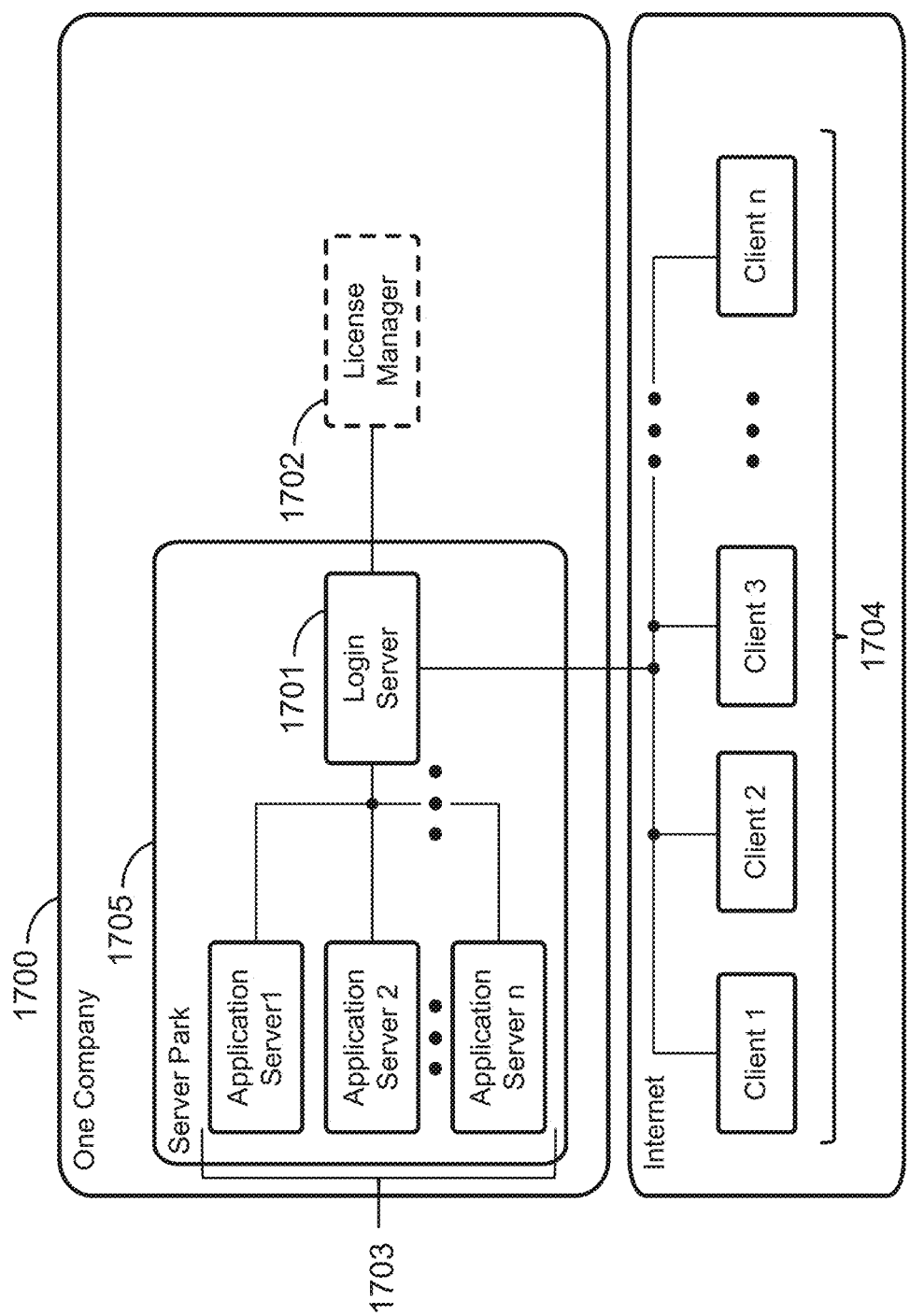
FIG. 17 illustrates an exemplary usage scenario where system components, such as application server(s) and a login server, are located in a server park and connected to a license manager, and the components are connected to clients located outside of a local area network through the Internet, according to aspects of the present disclosure.

FIG. 17 illustrates an exemplary usage scenario where system components, such as application server(s) and a login server, are located in a server park and connected to a license manager, and the components are connected to clients located outside of a local area network through the Internet, according to aspects of the present disclosure. The system 1700 of FIG. 17 includes a login server 1701, a license manager 1702, one or more active and/or inactive instances of application servers 1703 including one or more active and/or inactive applications, and one or more clients. The login server 1701 and one or more application server(s) 1703 are located on one or more computer systems in a server park 1705. The one or more clients 1704 are located on second computer systems or terminals, connected through the login server 1701 to the application servers 1703 via the Internet. The license manager 1702 is located on a third computer system, within or outside the server park. The application servers 1703, login server 1701, and license manager 1702 are located within the same company or organization.

Figure 18:
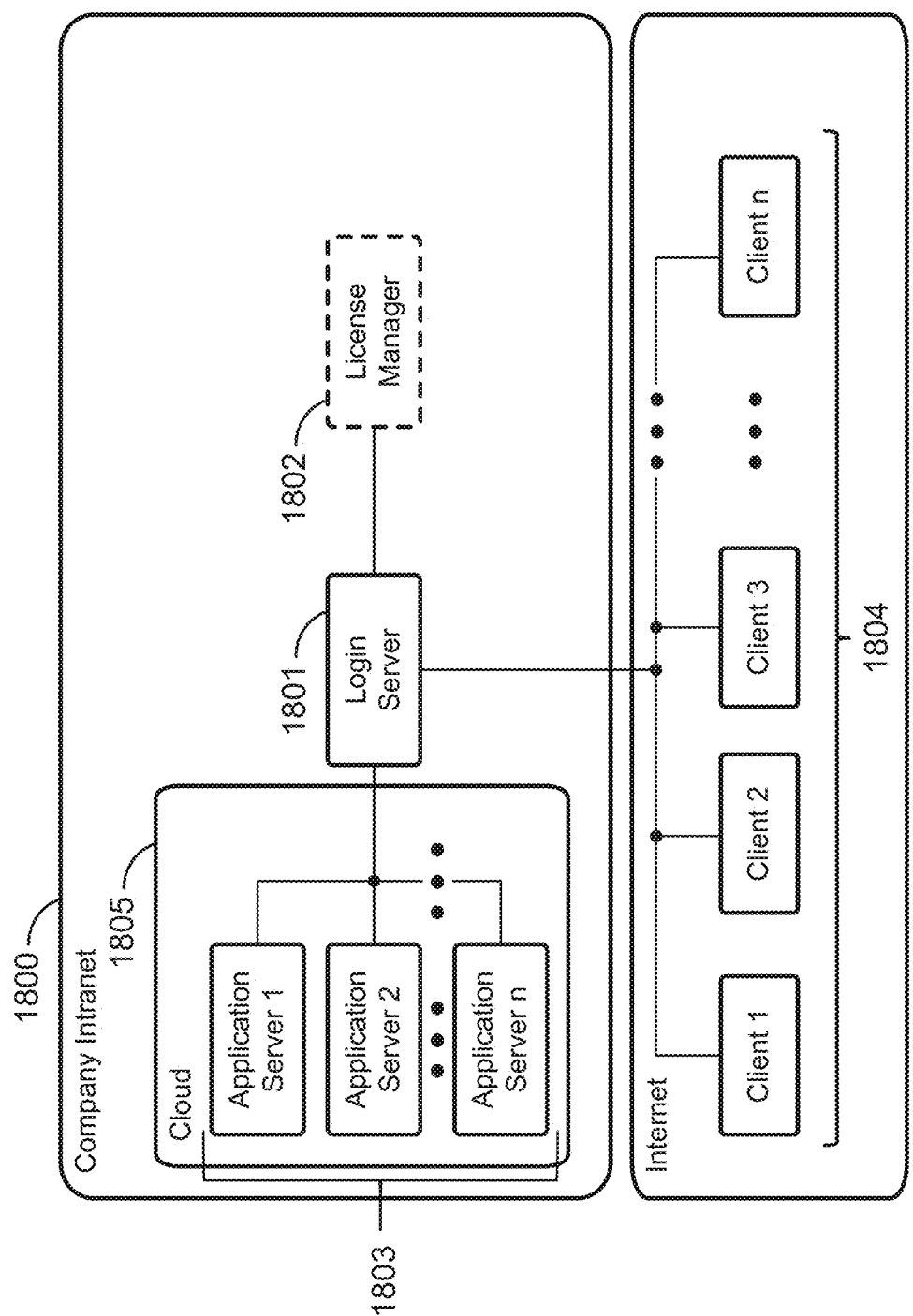
FIG. 18 illustrates an exemplary usage scenario where system components such as application server(s) are located on cloud computing nodes and connected to a login server and a license manager, where the system components are located within a local area network or private network and are connected, through the Internet, to clients located outside the local area network or private network, according to aspects of the present disclosure.

FIG. 18 illustrates an exemplary usage scenario where system components such as application server(s) are located on cloud computing nodes and connected to a login server and a license manager, where the system components are located within a local area network or private network and are connected, through the Internet, to clients located outside the local area network or private network, according to aspects of the present disclosure. The system 1800 of FIG. 18 includes a login server 1801, a license manager 1802, one or more active and/or inactive application servers 1803 including one or more active and/or inactive instances of applications, and one or more clients 1804. The one or more application server(s) 1803 are located on one or more cloud compute nodes 1805. The one or more clients 1804 are located on second computer systems or terminals, and the license manager 1802 is located on a third computer system, which may or may not be a cloud compute node. The application servers 1803 are located on cloud compute nodes 1805 within a company or organization intranet and the login server 1801 and license manager 1802 are also located within the same company or organization intranet. The one or more clients 1804 are located on second computer systems or terminals, connected through the login server 1801 to the application servers 1803 via the Internet.

Figure 19:
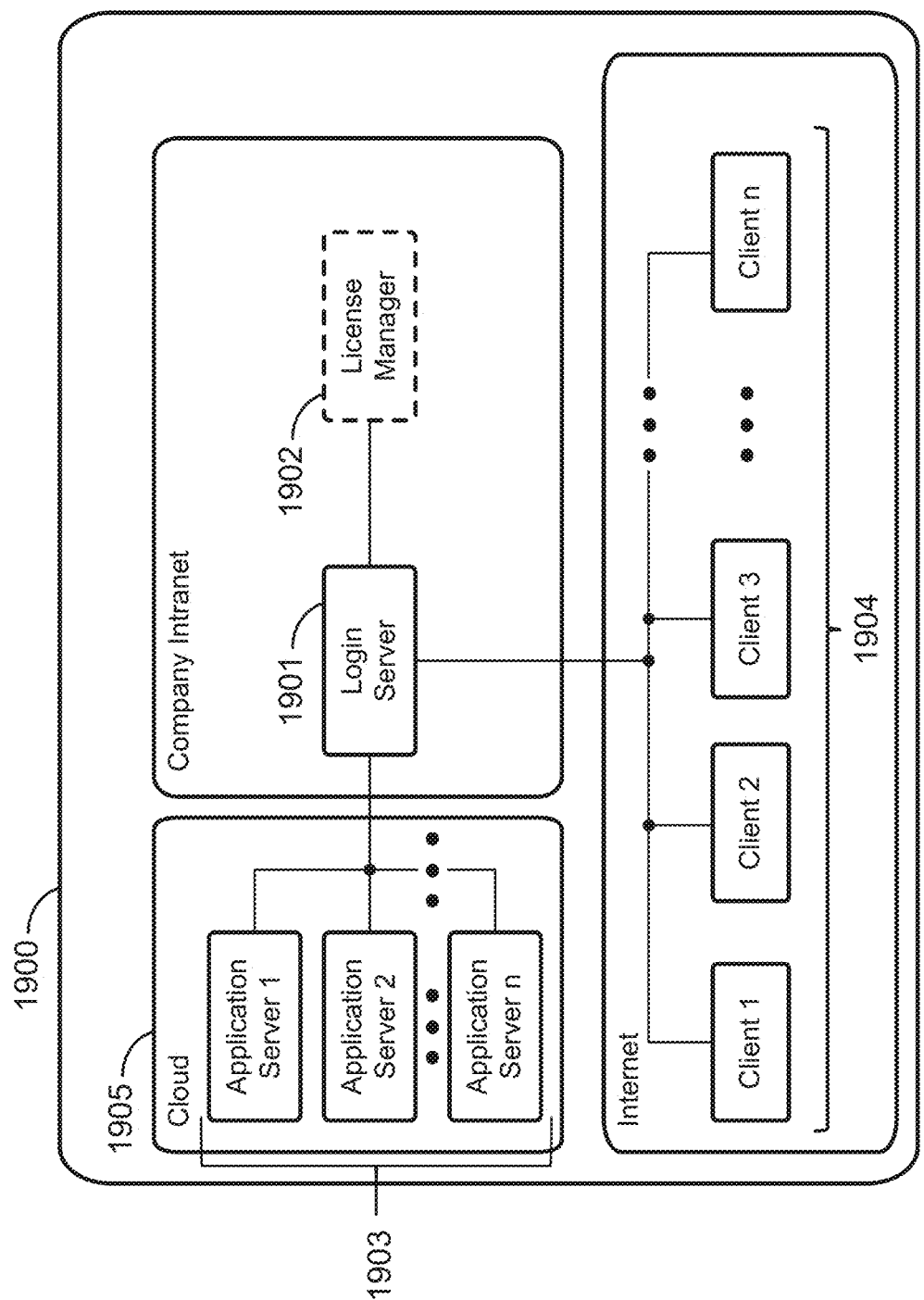
FIG. 19 illustrates an exemplary usage scenario where application server(s) are located on cloud computing nodes, external to a private network, and connected to a login server, clients, and a license manager located within a local area network or private network, where the login server is connected through the Internet to clients external to the private network, according to aspects of the present disclosure.

FIG. 19 illustrates an exemplary usage scenario where application server(s) are located on cloud computing nodes, external to a private network, and connected to a login server, clients, and a license manager located within a local area network or private network, where the login server is connected through the Internet to clients external to the private network, according to aspects of the present disclosure. The system 1900 of FIG. 19 includes a login server 1901, a license manager 1902, one or more active and/or inactive application servers 1903 including one or more active and/or inactive instances of applications, and one or more clients 1904. The one or more application server(s) are located on one or more cloud compute nodes 1905. The one or more clients 1904 are located on second computer systems or terminals, and the license manager is located on a third computer system, which may or may not be a cloud compute node 1905. The application servers 1903 are located on cloud compute nodes 1905 outside a company or organization intranet. The login server 1901 and license manager 1902 are located within the company or organization intranet. The one or more clients 1904 are located on second computer systems or terminals, connected through the login server 1901 to the application servers 1903 via the Internet.

Figure 20:
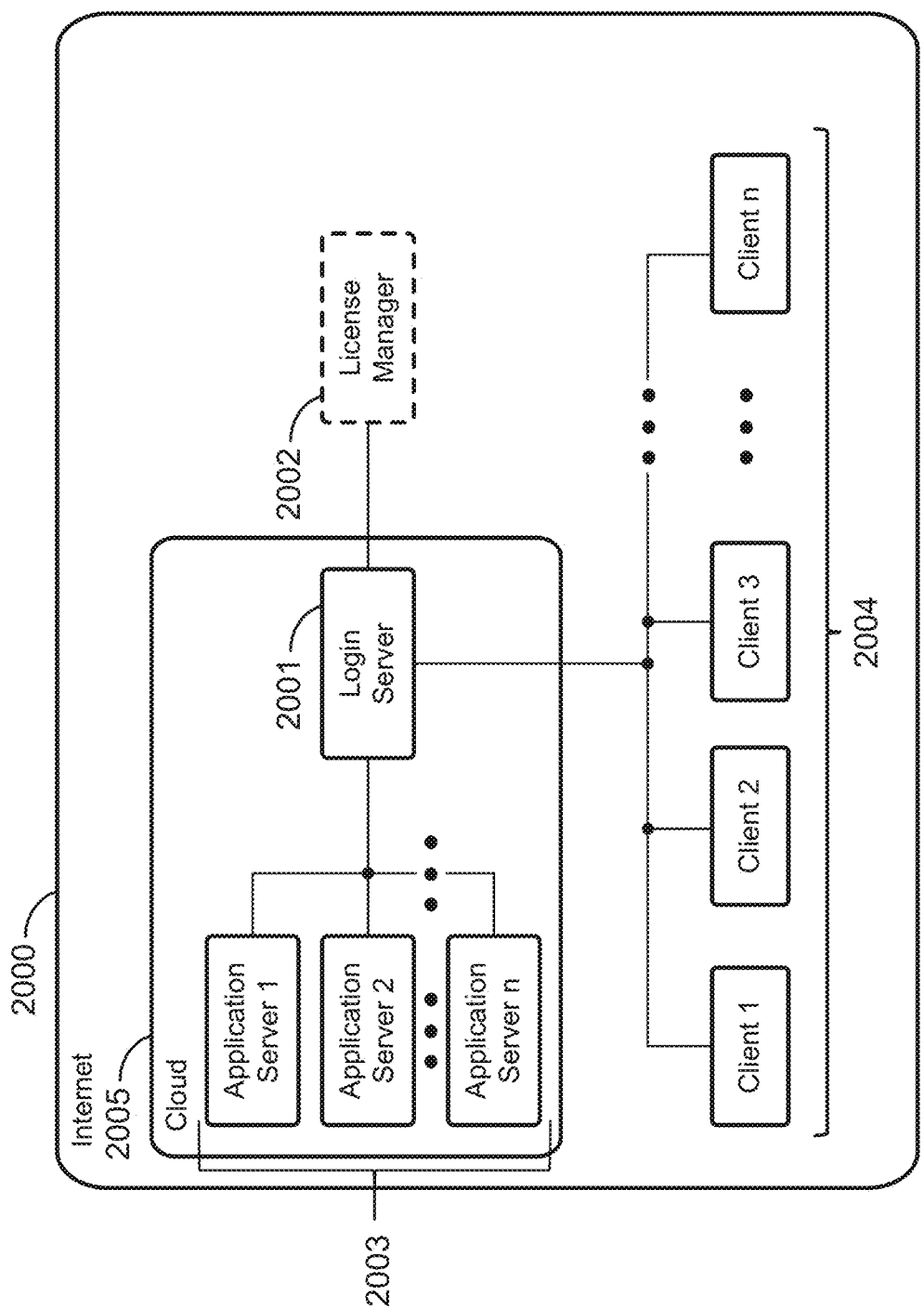
FIG. 20 illustrates an exemplary usage scenario where application server(s) and a login server are located on cloud computing nodes, and are connected to a license server and connected through the Internet to clients, according to aspects of the present disclosure.

FIG. 20 illustrates an exemplary usage scenario where application server(s) and a login server are located on cloud computing nodes, and are connected to a license server and connected through the Internet to clients, according to aspects of the present disclosure. The system 2000 of FIG. 20 includes a login server 2001, a license manager 2002, one or more active and/or inactive application servers 2003 including one or more active and/or inactive instances of applications, and one or more clients 2004. The one or more application server(s) 2003 and the login server 2001 are located on one or more cloud compute nodes 2005. The one or more clients 2004 are located on second computer systems or terminals, and the license manager 2002 is located on a third computer system, which may or may not be a cloud compute node. The one or more clients 2004 are located on second computer systems or terminals and are connected through the login server 2001 to the application servers 2003 via the Internet.

In an alternative aspect A, systems and/or methods include pre-launching application servers and pre-loading instances of physics modeling applications into computer memory. The type of pre-loaded instances of applications is based on startup frequencies of different application types.

In an alternative aspect B, the systems and/or methods of alternative aspect A further include a user selecting physics modeling applications using a user interface on a terminal. In response to selecting an application, a connection is made to an inactive application server including an instance of the selected application. The inactive application server and inactive instance of an application is turned or transitioned into an active application server and an active instance of an application. The application servers and applications are located on computing systems connected to the terminal through a computer network.

In an alternative aspect C, the systems and/or methods of alternative aspects A or B further include license management of the physics modeling applications. An instance of an application does not use a license when inactive, but the application, in response to being selected by a user, requests one or more licenses from a license manager and upon receiving the requested licenses, is turned active.

In an alternative aspect D, the systems and/or methods of any one of alternative aspects A to C further include the physics modeling application transitioning to a hibernating state upon a user exiting the application. A hibernating application includes saving or suspending the state of an instance of an application in a non-used state, and keeps the saved or suspended instance loaded into the computer's memory, or fully or at least in part on a computer storage unit.

In an alternative aspect E, the systems and/or methods of any one of alternative aspects A to D further include a user reconnecting to a hibernating instance of a physics and/or multiphysics modeling and simulation application and turning the instance of the application back into an active application.

Each of the aspects described above and obvious variations thereof are contemplated as falling within the spirit and scope of the claimed invention, which is set forth, but not limited to, the following claims.

What is claimed is:

1. A computer-implemented method for preparing one or more instances of physics modeling applications for use over a computer network based on expected use by a user of a modeling system, the method being implemented on a server system remote from the user of the modeling system, the server system including one or more physical processors and one or more memory devices, the one or more physical processors being configured to implement the acts of:
    pre-launching one or more inactive application servers and pre-loading at least one of the one or more inactive instances of physics modeling applications onto one or more of the pre-launched application servers, the pre-loading of the at least one of the one or more instances of physics modeling applications being made onto at least one of the one or more memory devices, the at least one of the one or more memory devices operating on one or more servers of the server system;
    receiving from a computer network communicatively coupled to a communications interface of the server system, an input signal indicative of a user request to initiate one or more instances of physics modeling applications;
    in response to receiving the input signal, sending to the computer network via the communications interface at least a portion of the one or more instances of physics modeling applications, one or both of the pre-launching and pre-loading providing a reduced startup time of the pre-launched one or more inactive application servers and the pre-loaded one or more instances of physics modeling applications;
    upon receiving the input signal indicative of the user request, sending via a communications interface communicatively coupled to a license server a first output signal indicative of one or more licenses for the one or more instances of pre-loaded physics modeling applications requested to be initiated;
    receiving a second input signal indicative of a response from the license server, the second input signal indicating an available license and further allowing a transitioning of at least one of the one or more physics modeling applications from an inactive mode to an active mode; and
    receiving a third input signal indicative of a user request to: (i) stop using at least one of the one or more physics modeling applications, (ii) transition the at least one of the one or more physics modeling applications from an active mode to a hibernation mode, and (iii) send a second output signal to the license server indicating a request to release at least one license corresponding to the at least one physics modeling application transitioned to the hibernation mode.

2. The method of claim 1, wherein the sending at least the portion of the one or more instances of physics modeling applications includes sending data corresponding to a user interface for the application.

3. The method of claim 1, further comprising executing on at least one of the one or more physical processors at least one of the one or more instances of pre-loaded physics modeling applications corresponding to the input signal indicative of the user request.

4. The method of claim 1, wherein the server system and the modeling system are communicatively coupled through an internet.

5. The method of claim 1, wherein the server system and the modeling system are communicatively coupled through an intranet.

6. The method of claim 1, further comprising reconnecting to a hibernating instance of a physics modeling application, the reconnecting including transitioning the hibernating instance of the application from the hibernating mode into an active instance of the application.

7. The method of claim 6, wherein the reconnecting further includes receiving a fourth input signal indicative of licenses required for executing the active instance of the application.

8. A simulation system configured to receive data corresponding to one or more instances of physics modeling applications determined according to an expected usage of the physics modeling applications, the expected usage determined based on at least one statistical model executed on a server system communicatively coupled to the simulation system, the server system configured to pre-launch one or more inactive application servers and pre-load one or more inactive instances of physics modeling applications onto one or more of the pre-launched application servers in response to determining that the expected usage meets a pre-determined usage criteria, the simulation system comprising:

one or more physical memory devices;
one or more display devices;
one or more user input devices;
a communications interface configured to be coupled to a computer network; and
one or more physical processors configured to execute instructions stored on at least one of the one or more physical memory devices, the instructions causing at least one of the one or more physical processors to perform the acts of:
generating, via the one or more input device, an input signal indicative of a user request to initiate a physics modeling application;
sending, via the communications interface, a first output signal to the computer network, the first output signal indicative of the user request to initiate an instance of the physics modeling application;
in response to sending the output signal, receiving from the computer network, via the communications interface, data corresponding to at least a portion of the one or more pre-launched instances of physics modeling applications including data corresponding to a user interface;
displaying the user interface on at least one of the one or more display devices;
sending, via a communications interface communicatively coupled to a license server, a second output signal indicative of one or more licenses for the one or more instances of physics modeling applications requested to be initiated;
receiving a second input signal indicative of a response from the license server, the second input signal indicating an available license and further allowing a transitioning of at least one of the one or more physics modeling applications from an inactive mode to an active mode; and
generating a third input signal via the user interface indicative of a user request to: (i) stop using at least one of the one or more physics modeling applications, (ii) transition the at least one of the one or more physics modeling applications from an active mode to a hibernation mode, and (iii) send a third output signal to the license server indicative of a request to release at least one license corresponding to the at least one physics modeling application transitioned to the hibernation mode.

9. The simulation system of claim 8, wherein upon the at least one physics modeling application being transitioned to the hibernating mode, storing at least a portion of data received from the user via the user interface.

10. The simulation system of claim 9, further comprising reconnecting to a hibernating instance of a physics modeling application, the reconnecting including transitioning the hibernating instance of the physics modeling application from the hibernating mode into an active instance of the physics modeling application.

11. The simulation system of claim 10, wherein the reconnecting further includes receiving a fourth input signal indicative of licenses required for executing the active instance of the physics modeling application.

12. A computer-implemented method for hibernating one or more instances of physics modeling applications, the method implemented on a server system remote from the user(s) of the modeling system, the server system including one or more physical processors and one or more memory devices, the one or more physical processors being configured to implement the acts of:

launching one or more application servers operating on a server system;
receiving, from a computer network communicatively coupled to the server system, an input signal indicative of a user request to initiate one or more instances of physics modeling applications;
in response to receiving the input signal, loading at least one of the one or more instances of the physics modeling applications associated with the user request onto one or more of the launched application servers;
sending, to the computer network via the communications interface, at least a portion of the one or more instances of physics modeling applications associated with the user request;
upon receiving the input signal indicative of the user request, sending via a communications interface communicatively coupled to a license server a first output signal indicative of one or more licenses for the one or more instances of physics modeling applications associated with the user request and receiving a second input signal indicative of a response from the license server, the second input signal indicating an available license and the second input signal further initiating at least one of the one or more physics modeling applications; and
receiving a third input signal indicative of a user request to: (i) stop using at least one of the one or more physics modeling applications, (ii) transition the at least one of the one or more physics modeling applications from an active mode to a hibernation mode, and (iii) send a second output signal to the license server indicating a request to release at least one license corresponding to the at least one physics modeling application transitioned to the hibernation mode.

13. The method of claim 12, further comprising reconnecting to a hibernating instance of a physics modeling application, the reconnecting including transitioning the hibernating instance of the application from the hibernating mode into an active instance of the application.

14. The method of claim 13, wherein the reconnecting further includes receiving a fourth input signal indicative of licenses required for executing the active instance of the application.

15. The method of claim 14, wherein the sending at least the portion of the one or more instances of physics modeling applications includes sending data corresponding to a user interface for the application.

* * * * *